US012066936B1

(12) United States Patent
Eliaz et al.

(10) Patent No.: US 12,066,936 B1
(45) Date of Patent: Aug. 20, 2024

(54) CACHE MEMORY WITH DECOUPLED CONTROL PATHS

(71) Applicant: Habana Labs Ltd., Caesarea (IL)

(72) Inventors: Ehud Eliaz, Tel Aviv (IL); Eitan Joshua, Tel Aviv (IL); Yori Teichman, Udim (IL); Ofer Eizenberg, Binyamina (IL)

(73) Assignee: Habana Labs Ltd., Caesarea (IL)

( * ) Notice: Subject to any disclaimer, the term of this patent is extended or adjusted under 35 U.S.C. 154(b) by 221 days.

(21) Appl. No.: 17/699,576

(22) Filed: Mar. 21, 2022

(51) Int. Cl.
*G06F 12/08* (2016.01)
*G06F 12/0802* (2016.01)

(52) U.S. Cl.
CPC ...... *G06F 12/0802* (2013.01); *G06F 2212/60* (2013.01)

(58) Field of Classification Search
CPC .......................... G06F 12/0802; G06F 2212/60
See application file for complete search history.

(56) References Cited

U.S. PATENT DOCUMENTS 8,683,167 B1 * 3/2014 Clark .................. G06F 12/0893
711/115

\* cited by examiner

*Primary Examiner* — Jae U Yu
(74) *Attorney, Agent, or Firm* — Akona IP PC

(57) ABSTRACT

An example cache memory includes a schedule module, control modules, a datapath, and an output module. The cache memory receives requests to read and/or write cache lines. The schedule module maintains a queue of the requests. The schedule module may assign the requests to the control modules based on the queue. A control module, which receives a request, controls the datapath to execute the request, i.e., to read or write the cache line. The control module can control the execution by the datapath from start to end. Multiple control modules may control parallel executions by the datapath. The output module outputs, e.g., to a processor, responses of the cache memory to the requests after the executions. A response may include a cache line. The cache memory may include a buffer that temporarily stores cache lines before the output to avoid deadlock in the datapath during the parallel executions of requests.

25 Claims, 15 Drawing Sheets

US 12,066,936 B1

CACHE MEMORY WITH DECOUPLED CONTROL PATHS

TECHNICAL FIELD

This disclosure relates generally to computer memory, and more specifically, to cache memory.

BACKGROUND

Cache memory (also referred to as cache) is a computer component that acts as a temporary data storage. Cache memory may be integrated directly into the chip of the computer's processor or placed on a separate chip that has a separate bus interconnect with the processor. Compared with the computer's main memory, cache memory can be more accessible to the processor and make the processor to retrieve data more efficiently.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Overview

Figure 1:
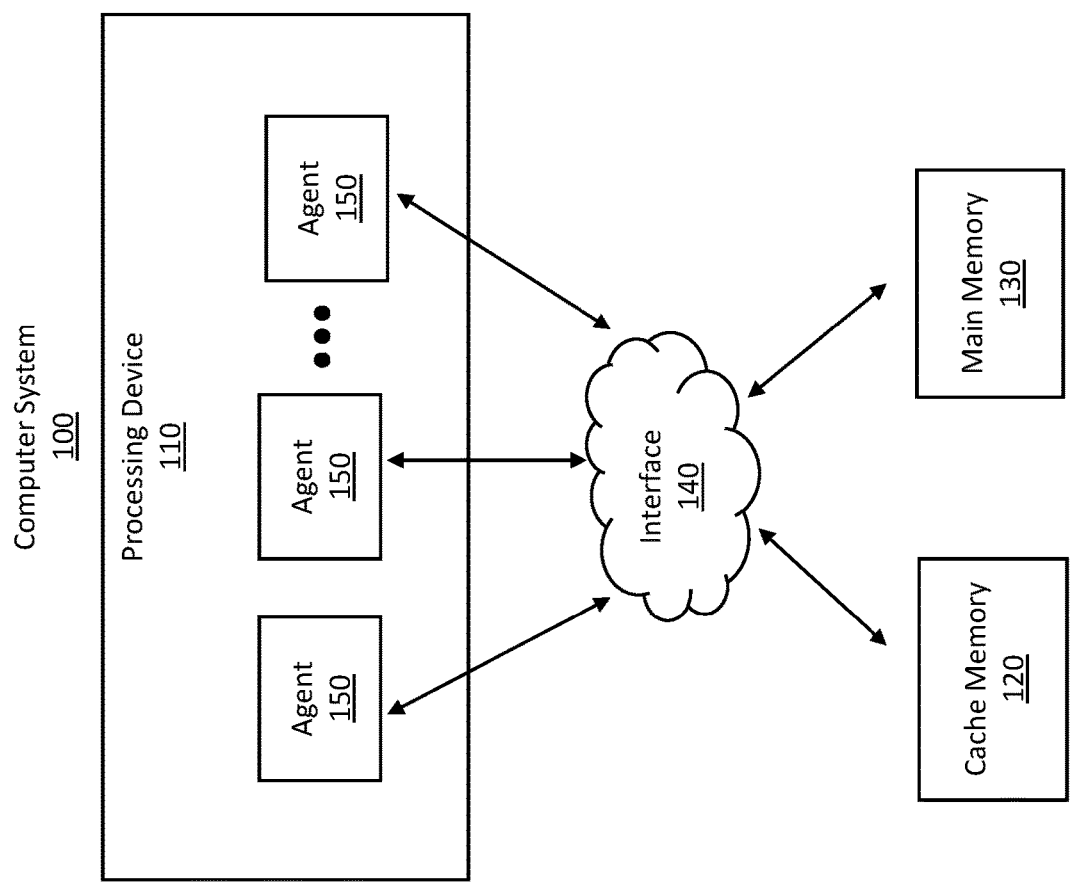
FIG. 1 illustrates an architecture of an example computer system including a cache memory, in accordance with various embodiments.

A computer system usually includes a processing device, a main memory, and a cache memory. The main memory and cache memory are sometimes referred together as the internal memory of the computer system, as they are internal to the computer system. The processing device can execute instructions, e.g., instructions comprising a computer program. The main memory, which usually includes a DRAM (dynamic random-access memory), stores information used or generated by the processing device. The cache memory, which usually includes a SRAM (static random-access memory), is copies of data in the main memory. The cache memory has a significantly shorter access time than the main memory due to both time and space locality. Time locality consists in a tendency to use many times the same data during neighboring time intervals. Space locality is a tendency to store information in shorter distances of time under neighboring addresses in the main memory. Due to these localities, the information loaded to the cache memory is used several times and the execution time of the processing device is much reduced.

When the processing device needs to access an address in the main memory to fetch information, the processing device sends the address first to the cache memory. A control unit of the cache memory checks if the requested information resides in the cache memory. If it does, a cache hit occurs, and the requested information can be fetched from the cache memory. However, if the requested information does not reside in the cache memory, a cache miss occurs, and the necessary information needs to be fetched from the main memory to the cache memory first and then to the processing device. The information usually is not copied in the cache memory as single words but as a data block of a fixed size. Such a data block in the cache memory is referred to as a cache line. Together with the data block, an address of the data block (e.g., a part of the address of the beginning of the block) can also be copied into the cache memory. This part of the address is next used at readout during identification of the data block.

A cache memory is typically constructed as a cache pipe. A cache pipeline can carry memory requests (e.g., reads or writes) over several cycles. A cycle usually includes a data flow along the datapath in the cache memory. The data flow can have multiple stages, such as look-up of a tag array, classification, and data movement. The cache pipeline typically includes multiple control units that are coupled together to control these stages, e.g., each control unit controls one of the stages. Such cache pipeline architecture can enable high area efficiency and lower latency as it utilizes the locality of the control and datapath of a request.

However, the cache pipeline architecture fails to meet the need of complex cache protocols while keeping the design flexibility for changes. For instance, with such cache pipeline architecture, it can be very complicated to manage the cache coherency problem that occurs between multiple processors in a multiprocessor computer system. The entire cache pipeline would have to be adjusted when a change in an individual data flow occurs. Also, the cache pipeline architecture often fails to provide complex semantics, such as atomic operations, vectors arithmetic's within cache, type conversions, etc. For a data flow that includes, for example, atomic operations, both the cache datapath and the control path need to be adjusted as the datapath is coupled to the control path and they can affect each other. A conventional solution to the problem is duplicating the datapath in the cache memory so that multiple memory requests can be executed through separate datapaths. However, it is expensive to duplicate the datapath, as the datapath typically includes expensive hardware components. Also, it consumes resources (e.g., space, power, etc.) to operate a cache memory with multiple datapaths.

Embodiments of the present disclosure may improve on at least some of the challenges and issues described above by providing cache memories with decoupled control paths. An example cache memory includes a schedule module, a datapath, control modules, and an output module. The cache memory may receive requests to read and/or write cache lines (also referred to as caching requests) from various agents, e.g., various processors. A cache line is a data block of a predetermined size. The schedule module maintains a queue, where the requests are arranged in an order. The order of the requests in the queue may be different from the order in which the requests are received. The schedule module assigns the requests to the control modules. A control module, after receiving a request of reading or writing a cache line, provides control signals to the datapath for the datapath to execute the request, i.e., to read or write the cache line. The control module can control the execution of the request by the datapath from start to end, e.g., the whole flow of the cache line through the datapath. The control modules facilitate decoupled control paths, i.e., each control module facilitates a control path that is separate from control paths facilitated by other control modules or other control paths facilitated by the same control module at other times. That way, the control modules can control parallel executions of requests by the datapath.

The output module outputs, e.g., to the agents, the response of the cache memory to the requests. A response of the cache memory to a request from an agent may include the cache line to be fetched by the agent. As the parallel flows of cache lines through the datapath may occur, to prevent possible Head-of-line blocking or deadlock between different cache lines, the cache memory may also include a buffer to absorb traffic going through the datapath. The buffer can temporarily store cache lines after the cache lines flow through the datapath and before they are output by the output module.

Different from the conventional solution that duplicates the datapath, the present disclosure provides a more advantageous technology to duplicate the control path. The present disclosure provides more flexibility of processing different requests from different sources. Any change or difference in requests can be addressed through adjustment of a single control module, as opposed to the entire cache architecture. The present disclosure can also reduce resource contention between different requests, as different requests can be handled by different control modules in parallel. Furthermore, the present disclosure provides easier Qos (quality of service) management (e.g., management of data traffic to reduce latency) between different types of requests and easier end-to-end flow coding and verification per cache line. Compared with the conventional solution of duplicating the datapath, the present disclosure provides a solution that is less expensive but more space efficient.

For purposes of explanation, specific numbers, materials and configurations are set forth in order to provide a thorough understanding of the illustrative implementations. However, it will be apparent to one skilled in the art that the present disclosure may be practiced without the specific details or/and that the present disclosure may be practiced with only some of the described aspects. In other instances, well known features are omitted or simplified in order not to obscure the illustrative implementations.

Further, references are made to the accompanying drawings that form a part hereof, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges.

The description uses the phrases "in an embodiment" or "in embodiments," which may each refer to one or more of the same or different embodiments. The terms "comprising," "including," "having," and the like, as used with respect to embodiments of the present disclosure, are synonymous. The disclosure may use perspective-based descriptions such as "above," "below," "top," "bottom," and "side" to explain various features of the drawings, but these terms are simply for ease of discussion, and do not imply a desired or required orientation. The accompanying drawings are not necessarily drawn to scale. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, various aspects of the illustrative implementations will be described using terms commonly employed by those skilled in the art to convey the substance of their work to others skilled in the art.

The terms "substantially," "close," "approximately," "near," and "about," generally refer to being within +/−20% of a target value based on the context of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the context of a particular value as described herein or as known in the art.

In addition, the terms "comprise," "comprising," "include," "including," "have," "having" or any other variation thereof, are intended to cover a non-exclusive inclusion. For example, a method, process, device, or system that comprises a list of elements is not necessarily limited to only those elements but may include other elements not expressly listed or inherent to such method, process, device, or system. Also, the term "or" refers to an inclusive "or" and not to an exclusive "or."

The systems, methods and devices of this disclosure each have several innovative aspects, no single one of which is solely responsible for all desirable attributes disclosed herein. Details of one or more implementations of the subject matter described in this specification are set forth in the description below and the accompanying drawings.

Example Computer System

FIG. 1 illustrates an architecture of an example computer system 100 including a cache memory 120, in accordance with various embodiments. The computer system 100 also includes a processing device 110 and a main memory 130 that are coupled to the cache memory 120 through an interface 140. The cache memory 120 and the main memory 130 may constitute an internal memory (or a part of an internal memory) of the computer system 100. In other embodiments, the computer system 100 may include fewer, more, or different components. For instance, the computer system 100 may include multiple processing devices, multiple main memories, or multiple caches. In some embodiments, the computer system 100 is implemented on a same integrated circuit or a same chip.

The processing device 110 includes one or more electronic circuitries that execute instructions in computer programs. The processing device 110 may include one or more digital signal processors (DSPs), application-specific ICs (ASICs), central processing units (CPUs), graphic processing units (GPUs), cryptoprocessors (specialized processors that execute cryptographic algorithms within hardware), server processors, or any other suitable processing devices. As shown in FIG. 1, the processing device 110 includes agents 150 (individually referred to as "agent 150"). Each agent 150 may be a separate processing unit (e.g., a processor) that can read and execute program instructions. The agents 150 can be arranged in a single integrated circuit. Some of the agents 150 may operate simultaneously. In some embodiments, all or some of the agents 150 may operate jointly to perform an operation. In other embodiments, the agents 150 may operate separately to perform separate operations. For instance, different agents 150 may retrieve data from the internal memory at the same time or at different times.

In some embodiments, the processing device 110 performs operations (e.g., logic, controlling, input/output, arithmetic operations) specified by the instructions in a computer program. The instructions may be stored in the internal memory of the computer system 100, e.g., the cache memory 120, the main memory 130, or both. An operation may involve other data stored in the internal memory. For example, the processing device 110 performs an operation with stored data and generates new data through the performance of the operation, and the new data can also be stored in the internal memory. An operation performed by the processing device 110 may include a sequence of steps. In an example operation, the first step may be a fetch step that includes retrieving data from the internal memory. For instance, the processing device 110 retrieves instructions or other data needed for performing an operation from the internal memory. The instructions specify what the processing device 110 will do to perform the operation. The next step may be a decode step that includes converting the instructions to control signals that control the processing device 110. After the fetch step and decode step, there may be an execute step that includes one or more actions of the processing device 110. In an action, control signals may electrically enable or disable one or more parts of the processing device to perform at least part of the operation.

The main memory 130 stores data to be used, generated, or otherwise associated with the processing device 110. The main memory 130 stores instructions of computer programs that can be executed by the processing device 110. The main memory 130 may also store operands of the executions by the processing device. An operand is, for example, a data block on which the processing device 110 performs an operation in the process of executing a computer program. The main memory 130 may include one or more volatile memory devices, such as DRAM. In some embodiments, the main memory 130 shares a die with the processing device 110.

The cache memory 120 acts as a buffer between the processing device 110 and the main memory 130 to reduce the average cost (e.g., time, energy, or both) of the processing device 110 to fetch data from the main memory 130. In some embodiments, the cache memory 120 has less storage capacity than the main memory 130. The cache memory 120 may have a smaller size than the main memory 130. The cache memory 120 may be integrated into a motherboard of the computer system 100. In some embodiments, the cache memory 120 may be located closer to the processing device 110 than the main memory 130. In other embodiments, the cache memory 120 may be embedded in the processing device 110 and be a component of the processing device 110. The smaller capacity of the cache memory 120 and/or closer proximity of the cache memory 120 to the processing device 110 may reduce the average cost to retrieve data from the internal memory. For instance, the cost to locate data in the cache memory 120 may be less than the cost to locate the same data in the main memory 130. Also, the cost of transferring data from the cache memory 120 to the processing device 110 may be less than the cost to transfer the same data from the main memory 130 to the processing device 110. The cache memory 120 may be coupled to the processing device 110 and the main memory 130 in various ways. In an example, the cache memory 120 intermediates between the processing device 110 and the main memory 130. In another example, the cache memory 120 is connected to a system bus that connects the processing device 110 with the main memory 130. In yet another example, the cache memory 120 is integrated with the processing device 110.

The cache memory 120 provides temporary data storage. In some embodiments, the cache memory 120 includes one or more SRAMs that can store data. The cache memory 120 may store a copy of data stored else, e.g., the main memory 130. For instance, a copy of program instructions may be read form the main memory 130 and written into the cache memory 120 so that future retrieval of the program instructions by the processing device 110 (e.g., an agent 150 of the processing device 110) can be faster. Data can be transferred between the main memory 130 and the cache memory 120 in blocks of fixed size, called cache lines or cache blocks. The fixed size may be, for example, 32 bytes or 64 bytes. When a cache line is copied from the main memory 130 into the cache memory 120, a cache entry (also referred to as "cache row entry") is created. The cache entry includes the copied data block (i.e., the cache line) and a tag. The tag may specify the location of the data block in the main memory 130. In an example, the tag specifies an index or an address of the data block in the main memory 130.

When the processing device 110 needs to read or write a location in memory, it first checks for a corresponding entry in the cache memory 120. The cache memory 120 checks for the contents of the requested memory location in any cache lines that might contain that address. If the memory location is in the cache, a cache hit has occurred. However, if the processing device 110 does not find the memory location in the cache, a cache miss has occurred. In the case of a cache hit, the processing device 110 may immediately read or write the data in the cache line. For a cache miss, the cache memory 120 may allocates a new entry and copy data from main memory 130, then the request is fulfilled from the contents of the cache memory 120. The processing device 110 may read or write an entire cache line when any byte in the cache line is read or written.

In some embodiments, data stored in the cache memory 120 does not have a copy in the main memory 130. For instance, the cache memory 120 stores the result of an operation performed by the processing device 110. The result is transferred from the processing device 110 to the cache memory 120 but has not been written into the main memory 130. Data blocks in the cache memory 120 can be written into the main memory 130 in accordance with a write policy supported by the cache memory 120. A write policy defines how data, which is written to the cache memory 120, is written to the main memory 130. The cache memory 120 may support one or more types of write policies. An example write policy is write-through, i.e., every write to the cache memory 120 causes a write to the main memory 130. Another write policy is write back, i.e., writes are not immediately mirrored to the main memory, instead data is written back to the main memory 130 when the data is evicted from the cache memory 120. The cache memory 120 may support other types of write policies.

In some embodiments, the cache memory 120 includes a data path, along which data flows occur, a plurality of control modules that manages the data flows along the data path, and a schedule module that schedules operations of the control modules. A data flow may be triggered by a request for fetching data from the cache memory 120 or writing data into the cache memory 120. The schedule module may maintain a queue of requests received by the cache memory 120 and determine when a request will be processed by which control module. The control module, which receives an assignment of a request, may manage the corresponding data flow from the beginning to the end. The cache memory 120 may further include a buffer that can store data of a data flow before the data can be output from the cache memory 120. That way, the cache memory 120 can facilitate parallel data flows along a single data path and avoid the consumption of resources (e.g., space, components, power, etc.) to duplicate the data path. Also, as the control modules can function separately to manage separate data flows, the cache memory 120 can provide flexibility for processing different requests and reduce resource contention between the requests. More details regarding the cache memory 120 are described below in conjunction with FIGS. 2, 4, and 5A-5E.

Example Cache Memory

Figure 2:
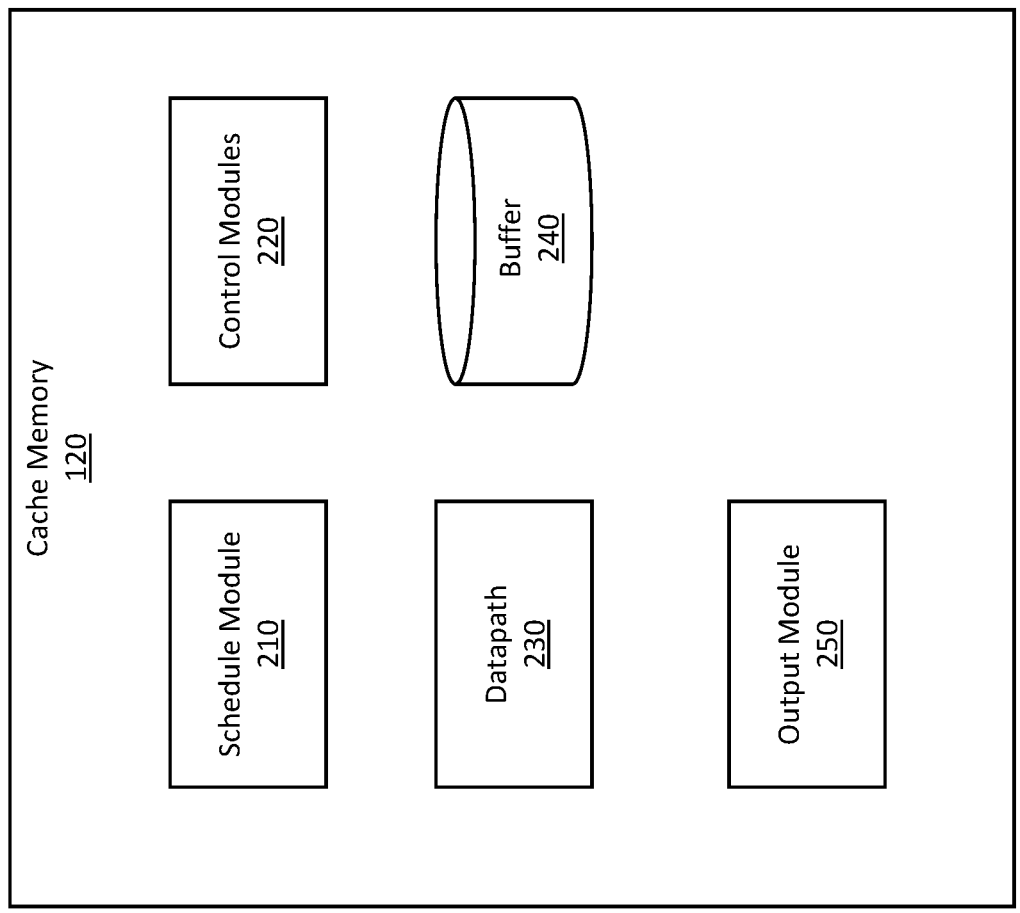
FIG. 2 is a block diagram of the cache memory including a schedule module, in accordance with various embodiments.

FIG. 2 is a block diagram of the cache memory 120, in accordance with various embodiments. The cache memory 120 includes a schedule module 210, control modules 220 (individually referred to as "control module 220"), a datapath 230, a buffer 240, and an output module 250. In other embodiments, alternative configurations, different or additional components may be included in the cache memory 120. Further, functionality attributed to a component of the cache memory 120 may be accomplished by a different component included in the cache memory 120 or a different system.

The schedule module 210 receives caching requests and schedules executions of the caching requests. The schedule module 210 may receive a caching request from the processing device 110, e.g., an agent 150 of the processing device 110. The caching requires may come from different agents 150. A caching request may be a request to read a cache line from the cache memory 120 or write a cache line into the cache memory 120. A cache line is a data block having a predetermined size, such as 16 bytes, 32 bytes, 64 bytes, and so on. A cache line may include a part of or a whole computer instruction, operand, output of the processing device 110, or some combination thereof. A caching request includes metadata, e.g., information needed to read or write the cache line. The metadata may include information indicating an address of the cache line in the main memory 130, a size of the cache line, a source of the cache line (e.g., the computer component where the data will be sent from), a destination of the cache line (e.g., the computer component where the data will be sent to), other information, or some combination thereof. In some embodiments (such as embodiments where the request is to write the cache line, the caching request may also include the cache line itself.

There can be multiple outstanding caching requests. For instance, the schedule module 210 may receive multiple caching requests from various agents at the same time. As another example, the schedule module 210 may receive new caching requests before existing caching requests are completely executed. The schedule module 210 maintains a queue for the outstanding caching requests, where the caching requests are arranged in an order. The schedule module 210 selects a caching request, e.g., the first caching request in the queue, to process.

After the schedule module 210 selects a caching request to process, the schedule module 210 identifies a control module 220 that is available for the caching request, i.e., a control module 220 that can process the caching request after it receives the assignment of the caching request from the schedule module 210. In some embodiments, the schedule module 210 determines whether one of the control modules 220 is in an idle state, i.e., a state where a control module 220 is not being assigned to any caching request so that the control module 220 can take on the caching request. A control module 220 may alternatively be in an active state, i.e., a state where the control module 220 is being assigned to a caching request (or in other words, the control module 220 is processing a caching request). In response to determining that a control module 220 is in the idle state, the schedule module 210 may assign the caching request to the control module 220. In some embodiments, the schedule module 210 may reserve a subset of the control modules 220 for caching requests in a particular category. The schedule module 210 would not assign other caching requests to the control modules 220 in the subset even when the control modules 220 are in the idle state. For a caching request in the category, the schedule module 210 can assign the caching request to an idle control module 220 in the subset. In embodiments where none of the control modules 220 in the subset are idle, the schedule module 210 may assign the caching request to an idle control module 220 that is not in the group. That way, the schedule module 210 can minimize the latency of assigning and completing the caching requests in the category.

In some embodiments, the schedule module 210 may also determine whether the buffer 240 has sufficient storage space to store the cache line of the caching request. After the schedule module 210 identifies a control module 220 that can process the caching request and determines that the buffer 240 has sufficient storage space, the schedule module 210 assigns the caching request to the control module 220 and instruct the control module 220 to process the caching request. The schedule module 210 may send the metadata of the caching request to the control module 220 and if the caching request includes a data block, send the data block to the datapath 230. In embodiments where the schedule module 210 fails to identify an available control module 220 or determines that the buffer 240 does not have sufficient storage space for a caching request, the schedule module 210 does not assign the caching request to any control module 220, and the assignment is failed. The schedule module 210 may keep the caching request in the queue and process the next caching request. After the schedule module 210 finishes processing the caching request (either the caching request is assigned or assignment is failed), the schedule module 210 may proceed to process other caching requests in the queue. The schedule module 210 can assign the other caching requests to other control modules 220. These control modules 220 can process the caching requests in parallel.

The control modules 220 receive assignments of caching requests from the schedule module 210 and controls executions of the caching requests by the datapath 230. Each control module may be a finite-state machine (FSM), a micro-controller, a programmable controller, or any other type of modules that can control executions of caching requests. In some embodiments, a control module 220 receives metadata of a caching request and generates control signals based on the metadata. The control module 220 sends the control signals to the datapath 230 so that the datapath 230 can execute the caching request in accordance with the control signals. The control signals may include address information of the cache line, e.g., the address of the cache line in the main memory 130. The control module 220 can control the flow of the cache line through the datapath 230 from start to end. In embodiments where the execution of the caching request by the datapath includes multiple stages, the control module 220 controls all the stages in the execution and can generate one or more control signals for each of the stages.

In addition to controlling the datapath, a control module 220, which processes a caching request, may also provide control signals to the buffer 240 and/or the output module 250. For instance, the control module 220 provides the buffer 240 a command to control storage of the cache line of the caching request in the buffer 240. As another example, the control module 220 provides the output module 250 an output instruction to control output of a response of the cache memory 120 for the request. Multiple control modules 220 can operate separately to process different caching requests, e.g., to control parallel executions of the caching requests through the datapath 230.

The datapath 230 executes caching requests. A datapath execution of a caching request may be a read operation (i.e., an operation of reading a cache line from the cache memory 120) or a write operation (i.e., an operation of writing a cache line into the cache memory 120). A datapath execution includes a flow of a cache line through the datapath 230. In some embodiments, the datapath 230 includes hardware components that perform operations for transferring cache lines. The hardware components may include elements that hold data (e.g., tag array, data array, etc.), elements that operate on data (e.g., multiplexer (MUX), logic control unit, etc.), buses for transferring data between elements, elements for timing stages of data flow (e.g., clock,) and so on. The datapath 230 executes caching requests based on control signals from the control modules 220. For each caching request, the datapath 230 receives control signals from the control module 220 that processes the caching request and completes the flow of the caching line from start to end in accordance with the control signals.

The datapath 230 can perform parallel executions of caching requests. The parallel executions of caching requests are separate from each other and may be performed based on separate control paths facilitated by different control modules 220. In the execution of a request to read a cache line, the datapath 230 may check tags in a tag array and determine whether any of the tags match the address information in the control signal from the control module 220. In response to determining that there is a match, the datapath 230 read the cache line from a data array based on the matching tag. In response to determining that there is no match, the datapath 230 may send feedback indicating a cache miss to the control module 220. In the execution of a request to write a cache line, the datapath 230 checks tag and write the cache line into the cache entry based on the tag.

The buffer 240 stores cache lines after the flow of the cache lines through the datapath 230 and before the cache lines are output from the cache memory 120 by the output module 250. The parallel executions of multiple caching requests along the same datapath 230 may cause traffic and result in Head-Of-The-Line blocking or deadlocks between the caching requests. The buffer 240 can absorb traffic going through the data path 230 and prevent the Head-Of-The-Line blocking or deadlocks by temporarily store the cache lines. In some embodiments, the buffer 240 includes a plurality of storage blocks, each of which may store one or more cache lines. The size of a storage block may be determined based on the predetermined size of the cache lines. For instance, the size of the storage block may be equal to or larger than the predetermined size of the cache lines, The output module 250 outputs responses of the cache memory 120 to caching requests. The output module 250 may output a response for one caching requests or for multiple caching requests. In some embodiments, the output module 250 generates and/or outputs a response for a caching request based on instructions from the control module 220 processing the caching request. The output module 250 may not output any response for a caching request under an instruction from the control module 220. The output module 250 may also provide feedback to the control module 220, e.g., a confirmation that the control module 220 that the response has been output. The control module 220 may update its status to idle after the confirmation.

A response of the cache memory 120 may include a cache line. Additionally or alternatively, a response of the cache memory 120 may include a request from the cache memory 120, e.g., to an agent 150 or the main memory 130. The request may be a cache coherency request or a main memory request. In an example where a caching request is to read a cache line and cache hit occurs, the output module 250 can transfer the cache line to the agent 150 that sent the caching request. The output module 250 may receive the cache line from the datapath 230 or retrieve the cache line from the buffer 240. In an example where a caching request is to read a cache line and cache miss occurs, the output module 250 can output a response that the cache line is not in the cache memory 120 to the agent 150. The response may include a request of writing the caching line, e.g., transferring the corresponding data block from the main memory 130 to the cache memory 120. That way, the agent 150 can make another caching request to write the cache line into the cache memory 120. In an example where a caching request is to write a cache line, the output module 250 can output a notification that the cache line has been written so that the agent 150 can make a new caching request to fetch the cache line from the cache memory 120.

Figure 3:
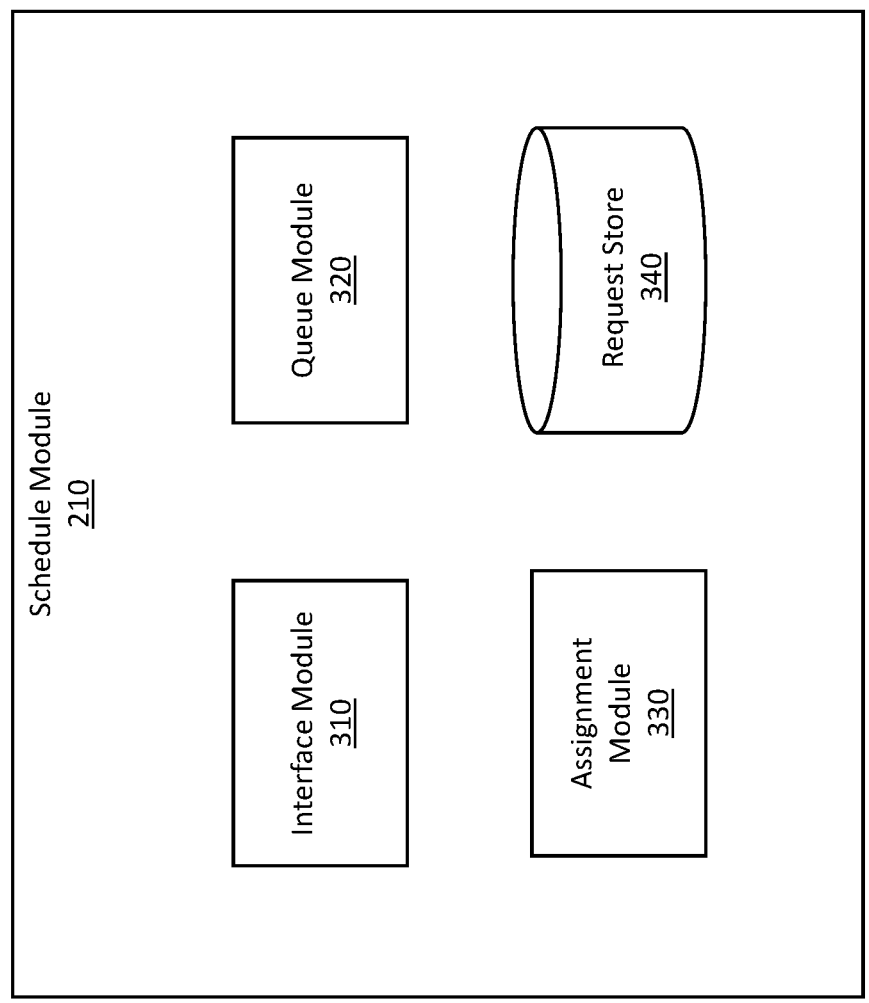
FIG. 3 is a block diagram of the schedule module, in accordance with various embodiments.

FIG. 3 is a block diagram of the schedule module 210, in accordance with various embodiments. The schedule module 210 includes an interface module 310, a queue module 320, an assignment module 330, and a request store 340. In other embodiments, alternative configurations, different or additional components may be included in the schedule module 210. Further, functionality attributed to a component of the schedule module 210 may be accomplished by a different component included in the schedule module 210, a component included in the cache memory 120, or a different system.

The interface module 310 facilitates communications of the schedule module 210 with other components of the cache memory 120 or other systems. In some embodiments, the interface module 310 receives caching requests from the processing device 110. In some embodiments, the interface module 310 may receive information from control modules 220, e.g., information indicating that a caching request is completed, information indicating that a caching request is failed, and so on. The interface module 310 may also send information to the control modules 220. For instance, the interface module 310 send metadata of a caching request to a control module 220 to which the caching request is assigned. The interface module 310 can also send data to the datapath 230, e.g., in embodiments where a caching request is to write the data into the cache memory 200.

The queue module 320 maintains a queue of the caching requests. The queue has an order, based on which the caching requests will be processed. In some embodiments, the queue module 320 determines the order of the caching requests in the queue by using a first in, first out (FIFO) method. For instance, the queue module 320 places a first caching request, which was received before a second caching request, before the second caching request in the queue. In another embodiment, the queue module 320 may rank caching requests and arrange the caching requests in the queue based on their rankings. The queue module 320 may rank the caching requests based on various factors, such as importance, urgency, data size, data source, data destination, other factors, or some combination thereof.

The queue module 320 may reposition a caching request, e.g., based on a notification from the assignment module 330 that the caching request cannot be assigned at the time. The queue module 320 may put the caching request after the next caching request in the queue, e.g., immediately after the next caching request, or after one or more other caching requests. In some embodiments, the queue module 320 may remove a caching request from the queue after the queue module 320 determines that a removal criterion is met. The removal criterion may be a successful assignment of the caching request to a control module 220, a notification from the control module 220 that the performance of the caching request has been completed, a notification from the control module 220 that the performance of the caching request has been failed (e.g., cache miss, etc.), and so on.

In some embodiments (e.g., embodiments where the assignment module 330 receives notifications indicating failed caching requests), the queue module 320 may send information (e.g., metadata, cache lines, or both) of failed caching requests to the request store 340. The information of a failed caching request may be retrieved from the request store 340 and be used for performing a new caching request. In an example where the assignment module 330 processes a cache task for reading a data block but cache miss occurs, the information for the cache task can be stored in the request store 340. After the data block is written into the cache memory 200 and a new caching request for reading the data block is generated, the information stored in the request store 340 may be retrieved, e.g., by the control module 220 receiving the new caching request, and be used to perform the new caching request. In some embodiments, the request store 340 stores a look-up table. The look-up table lists information of failed caching requests. The look-up table may also list identifiers of the failed caching requests, based on which the information of each failed caching request can be retrieved. An identifier may be an index, a memory address, a tag, etc.

The assignment module 330 assigns caching requests in the queue to control modules 220. In an embodiment, the assignment module 330 assigns the caching requests based on the order of the caching requests in the queue. For instance, the assignment module 330 processes the first caching request in the queue first. To assign a caching request, the assignment module 330 may identify a control module 220 that is available for the caching request. For instance, the assignment module 330 determines whether one of the control modules 220 is in an idle state. In response to determining that a control module 220 is in the idle state, the assignment module 330 may assign the caching request to the control module 220.

In some embodiments, the assignment module 330 may reserve a subset of the control modules 220 for caching requests in a particular category. The assignment module 330 would not assign other caching requests to the control modules 220 in the subset even when the control modules 220 are in the idle state. For a caching request in the category, the assignment module 330 can assign the caching request to an idle control module 220 in the subset. In embodiments where none of the control modules 220 in the subset are idle, the assignment module 330 may assign the caching request to an idle control module 220 that is not in the group. That way, the assignment module 330 can minimize the latency of assigning and completing the caching requests in the category. An example category is a category associated with a particular computer program. For instance, caching requests in the category are for fetching instructions of the compute program from the cache memory 120 or writing data generated by the compute program into the cache memory 120. Another example category is a category associated with the performance of the processing device or the computer system. For instance, caching requests in the category are for writing a copy of data stored in the main memory into the cache memory 120 after cache miss occurs. Timely completion of such caching requests can avoid latency in operations performed by the processing device. In such embodiments, in addition to determining whether a control module 220 is idle, the assignment module 330 may also determine whether the idle control module 220 is not reserved for a category into which the caching request does not fall. The assignment module 330 assigns the caching request to the control module 220 after it determines that the control module 220 is idle and is not reserved for any category into which the caching request does not fall.

In some embodiments, the assignment module 330 may also determine whether the buffer 240 can store the cache line of the caching request. For instance, the assignment module 330 may determine whether the buffer 240 includes a free storage block (i.e., a storage block that does not store data at the time) that has a size no smaller than the size of the cache line. After determining that the buffer 240 includes such a storage block, the schedule module 210 may reserve the storage block for the caching request, e.g., by preventing the storage block from storing other data.

After the assignment module 330 identifies an available control module 220 and reserves a storage block for a caching request, the assignment module 330 may send, e.g., through the interface module 310, the metadata of the caching request to the control module 220. In embodiments where the caching request includes a data block to be written into the cache memory 120, the assignment module 330 may also send, e.g., through the interface module 310, the data block to the datapath 230. In embodiments where the assignment module 330 fails to identify an available control module 220 or fails to reserve a storage block, the assignment module 330 may keep the caching request in the queue and process the next caching request.

After the assignment module 330 finishes the assignment of the caching request, the assignment module 330 may proceed to process the next caching requests in the queue. The assignment module 330 can assign the next caching request to a different control module 220. That way, multiple control modules 220 can process caching requests in parallel. In some embodiments, the assignment module 330 continues to assign caching requests to control modules 220 till all the caching requests in the queue are processed, all available control modules 220 are in active state, or all storage blocks in the buffer 240 are full.

Figure 4:
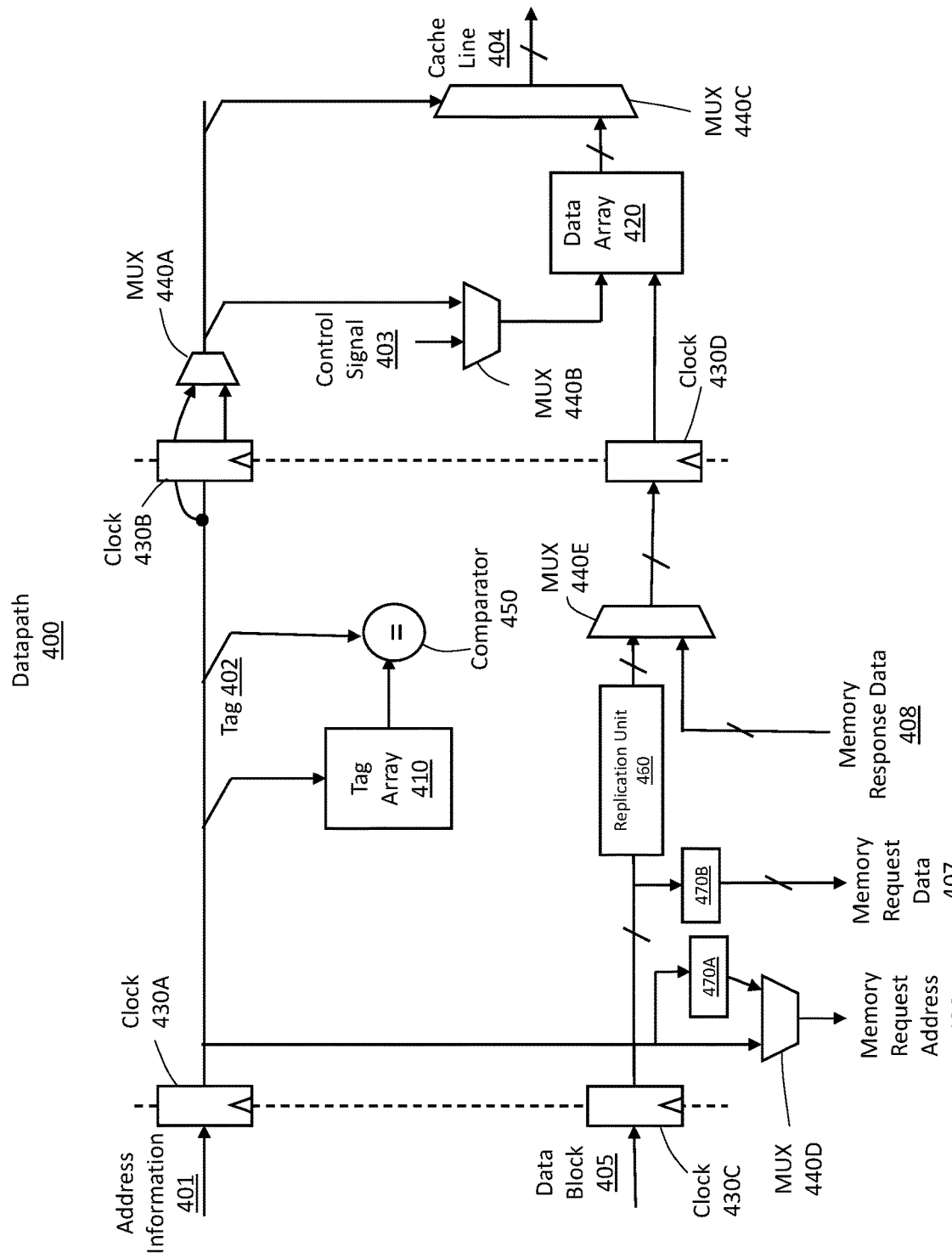
FIG. 4 illustrate an example datapath of a cache memory, in accordance with various embodiments.

FIG. 4 illustrate an example datapath 400 of a cache memory, in accordance with various embodiments. The datapath 400 may be an embodiment of the datapath 230, or of a portion of the datapath 230. For purpose of illustration, the datapath 400 includes components for executing parallel read and write operations. As shown in FIG. 4, the datapath 400 includes a tag array 410, a data array 420, clocks 430A-D (collectively referred to as "clocks 430" or "clock 430"), MUXs 440A-E (collectively referred to as "MUXs 440" or "MUX 440"), a comparator 450, a replication unit 460, and register transfer units 470A-B (collectively referred to as "register transfer units 470" or "register transfer unit 470"). In other embodiments, the datapath 400 may include fewer, more, or different hardware components.

A read operation may include a stage of tag check based on the tag array 410 and a stage of data extraction based on the data array 420. The tag array 410 stores a plurality of tags, each of which indicates an address of a cache line in a main memory, which is coupled to the cache memory. The data array 420 stores a plurality of cache lines, each of which corresponds to a tag in the tag array 410. In an example read operation, address information 401 is received by the datapath 400. The address information 401 may indicate an address in a main memory, e.g., the main memory 130. The address information 401 may be included in a control signal from a control module, e.g., a control module 220, that controls the read operation. A tag in the tag array 410 is identified based on the address information 401. For instance, the address information 401 is compared with tags in the tag array 410 to identify a tag that matches the address information 401. If a match (i.e., a tag in the tag array 410 matches the address information 401) is found, a cache line 404 is identified and red from the data array 420 based on the tag 402 and a control signal 403. The control signal 403 may be received by the datapath 400 from the control module. The cache line 404 is output from the datapath 400. In a write operation, a data block 405 to be written into the data array 420 as a cache line is input into the datapath. Also, memory request address 406, memory request data 407, and memory response data 408 can be obtained. The data block 405 is copied into the data array 420 through the replication unit 460. For purpose of simplicity and illustration, FIG. 4 shows read and write operations that hit. In other embodiments, the datapath 230 may execution read or write operations that miss.

Figure 5:
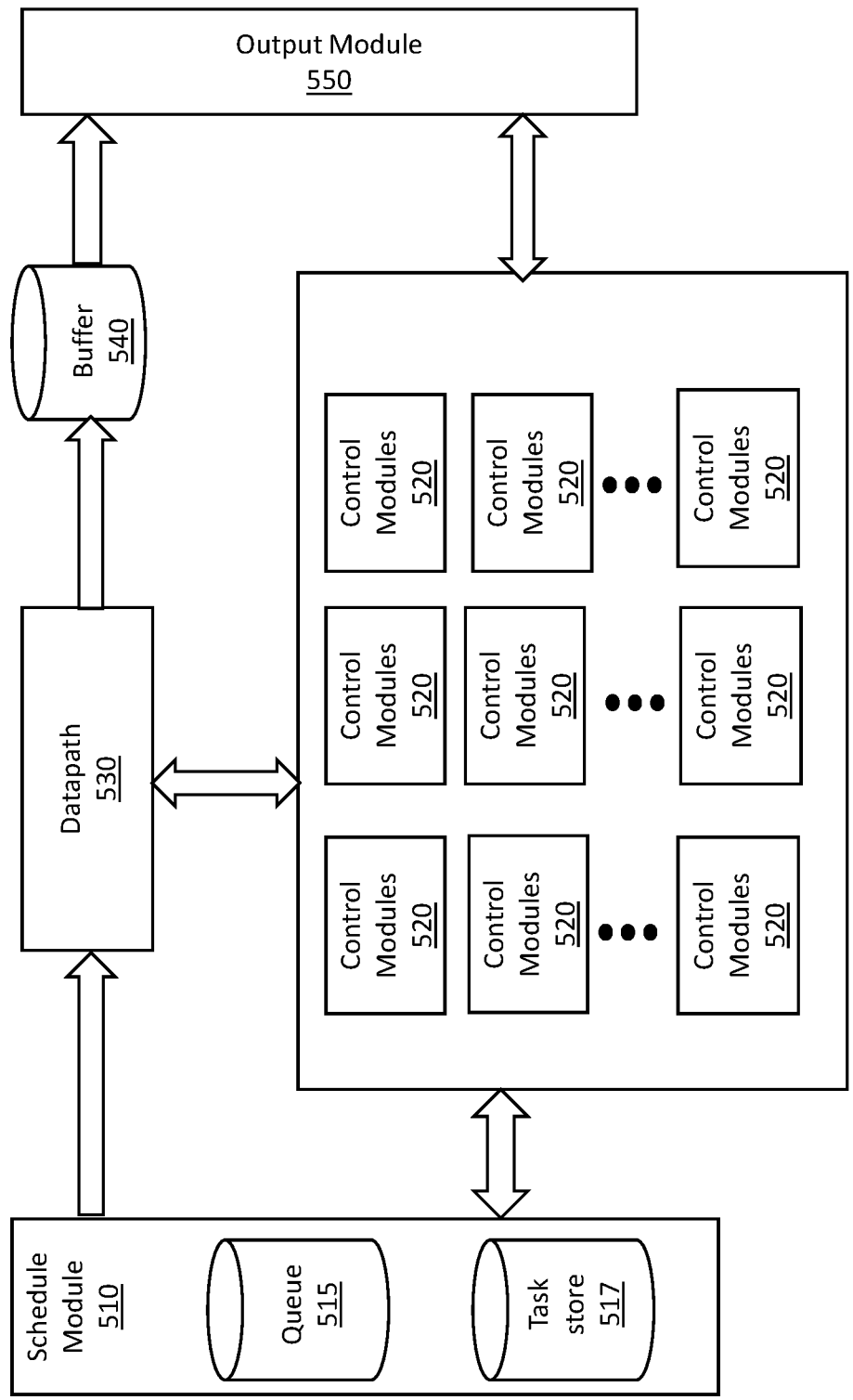
FIG. 5 illustrates an example cache memory including decoupled control paths for parallel datapath executions, in accordance with various embodiments.

FIG. 5 illustrates an example cache memory 500 including decoupled control paths for parallel datapath executions, in accordance with various embodiments. The cache memory 500 includes a schedule module 510, control modules 520, a datapath 530, a buffer 540, and an output module 550. In other embodiments, the cache memory 500 may include fewer, more, or different components. For instance, the cache memory 500 may include a different number of control modules 520. The cache memory 500 may be an embodiment of the cache memory 120.

In the embodiment of FIG. 5, the schedule module 510 places caching requests received by the cache memory 500 in a queue 515 and schedules executions of the caching requests based on the queue 515. The schedule module 510 initiates an execution of a caching request by the datapath 530 by assigning the caching request to a control module 520. In some embodiments, the schedule module 510 may also reserving a storage block in the buffer 540 for the caching request. The schedule module 510 sends information in the caching request, e.g., metadata, to the control module 520. In embodiments where the caching requests includes a data block to be written into the cache memory 500, the schedule module 510 sends the data block to the datapath 530.

The schedule module 510 may receive, e.g., from the control module 520, information indicating status of the execution of the caching request or status of the control module 520 itself. For instance, the schedule module 510 receives a notification that the execution of the caching request by the datapath 530 has successfully completed, that the execution of the caching request by the datapath 530 has failed, that the output module has sent out a response of the cache memory 500 to the caching request, that the control module 520 becomes idle, and so on.

The control module 520 generates control signals based on the metadata and provides the control signals to the datapath 530 through decoupled control paths. Decoupled control paths are separate control paths that are in parallel. Each control module can facilitate a control path at a time. The control path is decoupled from other control paths facilitated by the control module 520 at other times and decoupled from control paths facilitated by other control modules 520.

The datapath 530 executes caching requests based on control signals from decoupled control paths. The executions of the caching requests by the datapath 530 are through decoupled control paths. A datapath execution of a caching request corresponds to a control path facilitated by a control module 520. The datapath execution may include multiple stages (e.g., a stage of check tag, a stage of read, a stage of write back, etc.), in which the cache line flows through the datapath 530. The control module 520 can control all stages of the datapath execution from start to end through the control path.

After the datapath execution, the cache line may be transferred from the datapath 530 to the buffer 540, where the cache line can be stored. This way, the datapath 530 becomes available for the execution of the next caching request, and the datapath execution would not block other datapath executions. The buffer 540 absorbs traffic caused by parallel datapath executions through the same datapath 530 and prevent block of the datapath 530 between these datapath executions. The buffer 540 temporarily stores the cache line, e.g., till the output module 550 retrieves the cache lines and output it, e.g., to a processing device, e.g., the processing device 110.

The output module 550 receives an output instruction from the control module 520 and outputs a response of the cache memory 500 for the caching request based on the output instruction. The response includes the cache line, e.g., in an embodiment where a cache hit occurs. In an embodiment where a cache miss occurs, the response may include an indication that the request cache line is not in the cache memory 500. After the output module 550 outputs the response, the control module 520 becomes idle again and can receive and process another caching request.

Figure 6:
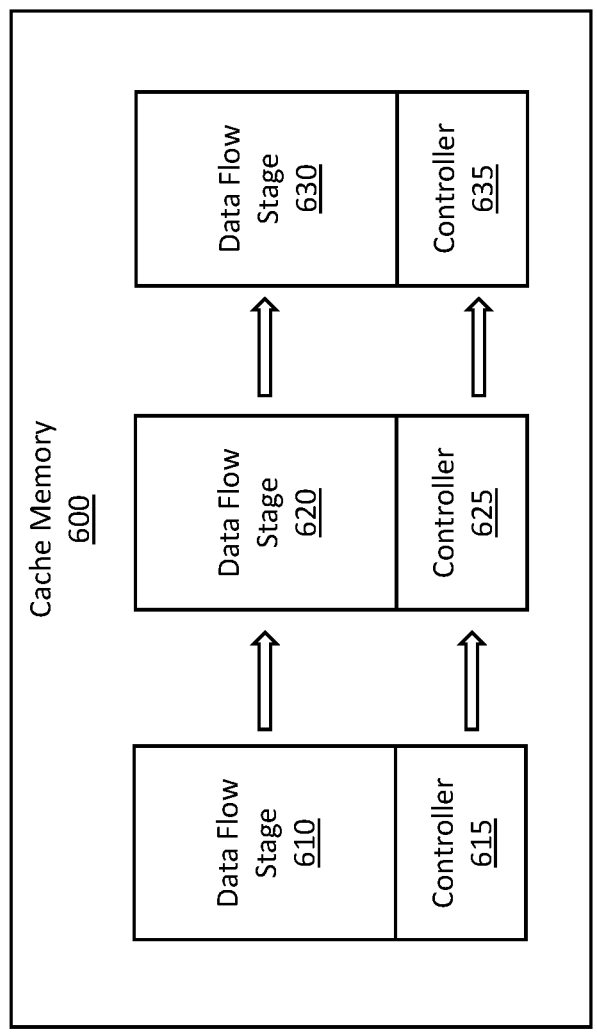
FIG. 6 illustrates an example cache including coupled control paths for a datapath execution, in accordance with various embodiments.

FIG. 6 illustrates an example cache memory 600 including coupled control paths for a datapath execution, in accordance with various embodiments. For purpose of illustration, the datapath execution in FIG. 6 includes three data flow stages 610, 620, and 630, which are coupled to controllers 615, 625, and 635, respectively. Each data flow stage is a flow of data through a portion of the datapath in the cache memory 600. The controllers 615, 625, and 635 facilitate coupled control paths. In an example, the controller 615 facilitates a control path that receives metadata of caching request and sends control signals to the controller 625, the controller 625 facilitates a control path that receives the control signals from the controller 615 and sends new control signals to the controller 635, and the controller 635 facilitates a control path that receives the control signals from the controller 625. These control paths are coupled together to control the data flow in the data flow stages 610, 620, and 630. They cannot operate separately. Changes in one stage 610, 620, or 630 of the datapath could result in changes in all of the controllers 615, 625, and 635. Thus, when the cache memory 600 receives different caching requests (e.g., from different agents), the entire architecture of the cache memory 600 must be adjusted. Compared with the cache memory 500, the cache memory 600 provides less flexibility and poorer cache coherency.

Example Parallel Datapath Executions by Decoupled Control Paths

FIGS. 7A-7F illustrate a process of using decoupled control paths to control parallel execution of caching requests by a datapath 730, in accordance with various embodiments. FIGS. 7A-7F show a cache memory 700 includes a schedule module 710, control modules 720A-I (collectively referred to as "control modules 720" or "control module 720"), a buffer 740, and an output module 750, in addition to the datapath 730. In other embodiments, the cache memory 700 may include fewer, more, or different components. For instance, the cache memory 700 may include a different number of control modules 720. The cache memory 700 may be an embodiment of the cache memory 120.

Figure 7A:
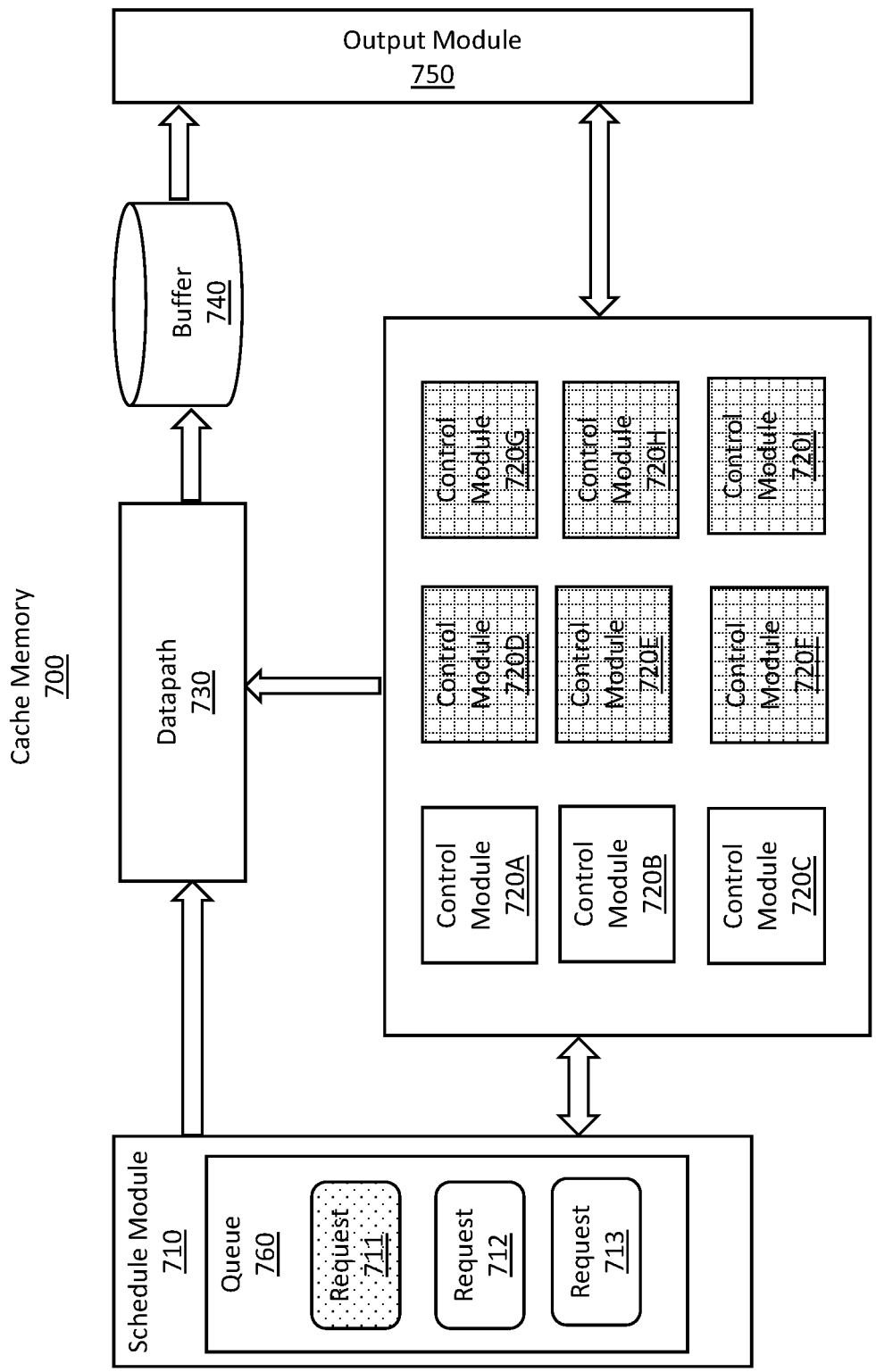
FIGS. 7A-7F illustrate a process of using decoupled control paths to control parallel execution of caching requests by a datapath, in accordance with various embodiments.

For purpose of illustration, the cache memory 700 receives three requests 711, 712, and 713, as shown in FIG. 7A. In other embodiments, there may be a different number of requests. The requests 711, 712, and 713 may be received from different agents, e.g., the agents 150, at the same time or different times. The schedule module 710 places the requests 711, 712, and 713 in a queue 760. The requests 711, 712, and 713 are arranged in a sequence, where the request 711 is the first request, the request 712 is the second request, and the request 713 is the third request. The schedule module 710 processes the requests 711, 712, and 713 based on their positions in the sequence.

In FIG. 7A, the schedule module 710 selects the first request in the queue, i.e., the request 711, to process. The request 711, in an example, is a request to read a cache line from the cache memory 700. The schedule module 710 determines whether the request 711 can be executed. For instance, the schedule module 710 determines whether a control module 720 is available for the request 711. In the embodiment of FIG. 7A, the schedule module 710 determines that the control modules 720D-I are unavailable for the request 711, e.g., on the ground that the control modules 720D-I are not in their idle states as they are being assigned to other requests or they are reserved for a category to which the request 711 does not belong. The schedule module 710 also determines that the control modules 720A-C are unavailable for the request 711 even though they are in their idle state, i.e., they are not being assigned to any requests. However, the schedule module 710 reserves the control modules 720A-C for requests of a category and does not assign a request that is not in the category to any of the control modules 720A-C. Given the lack of available control modules, the schedule module 710 determines that the request 711 cannot be assigned to any of the control modules 720 and that the request 711 cannot be executed at the time.

Figure 7B:
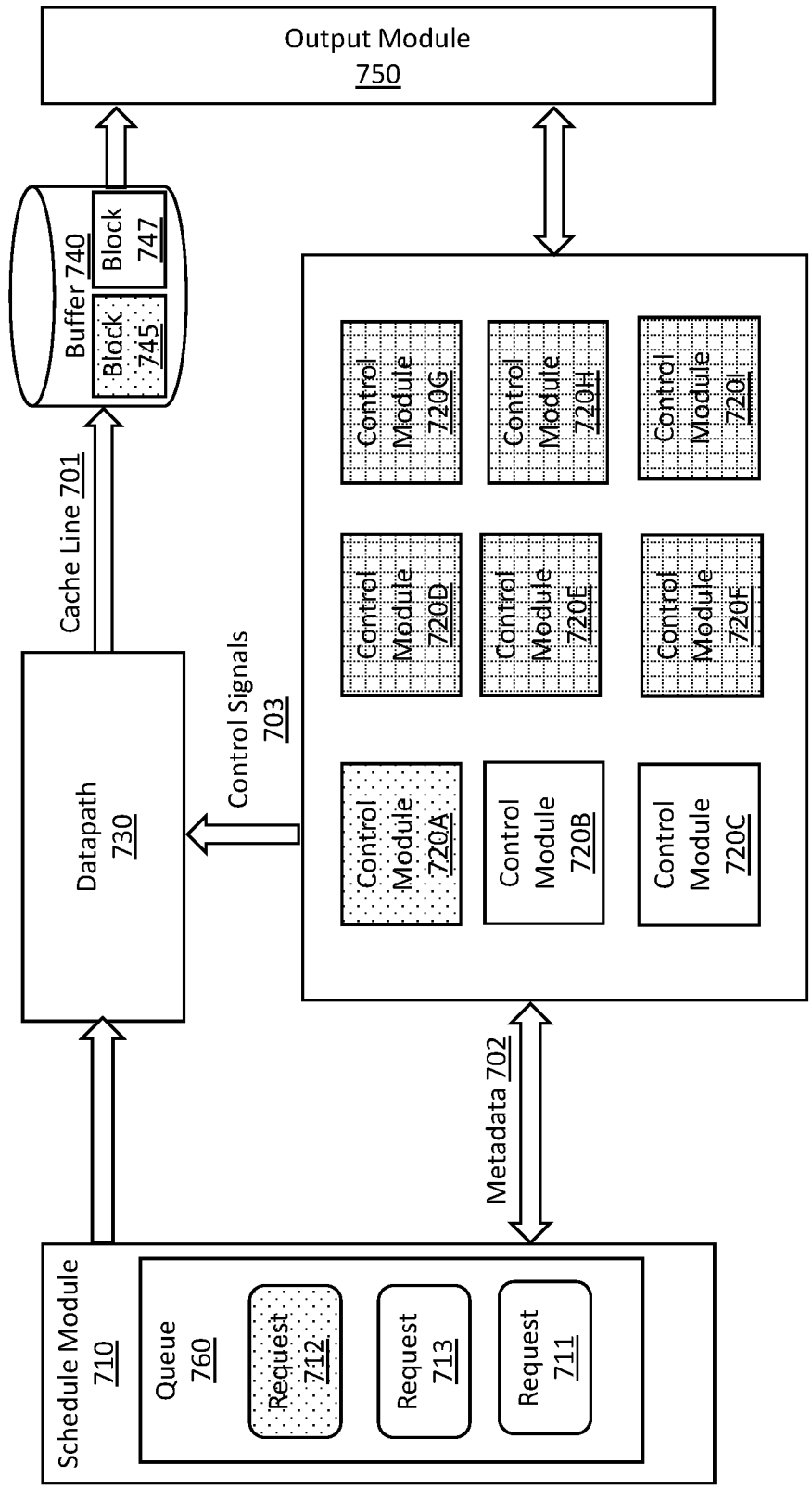

In FIG. 7B, the schedule module 710 repositions the request 711 in the queue and puts the request 711 after the request 714. The request 712 becomes the first request in the queue. The schedule module 710 processes the request 712. The request 712 is a request of reading a cache line 701 from the cache memory 700. In the embodiment of FIG. 7B, the schedule module 710 determines that the request 712 falls under the category associated with the control modules 720A-C and that the control module 720A is idle. Further, the schedule module 710 determines that the buffer 740 includes a block 745 that is empty (i.e., does not store any data at the time) and has a sufficient storage space to store the cache line 701 of the request 712. Based on the determinations, the schedule module 710 assigns the request 712 to the control module 720A. The schedule module 710 sends metadata 702 of the request 712 to the control module 720A. The metadata 702 includes address information of the cache line 701 in a main memory, e.g., the main memory 130, a size of the cache line 701, or other information of the request 712.

The control module 720A, after receiving the metadata 702, generates control signals 703 based on the metadata 702. The control module 720A sends the control signals 703 to the datapath 730. The datapath 730 executes the request 712 based on the control signals 703. For instance, the datapath 730 matches the address information with tags in a tag array in the datapath 730. After it identifies a matching tag, the datapath 730 reads the cache line 701 from a data array in the datapath 730 based on the matching tag. The cache line 701 is transferred from the data array to the buffer 740, particularly to the block 745 where the cache line 701 is temporarily stored before the output module 750 retrieves the cache line 701 from the buffer 740 and outputs the cache line 701, e.g., to a processor. The control module 720A also controls operation of the output module 750. In the embodiment of FIG. 7B, the control module 720A instructs the output module 750 not to retrieve the cache line 701 from the buffer 740.

Figure 7C:
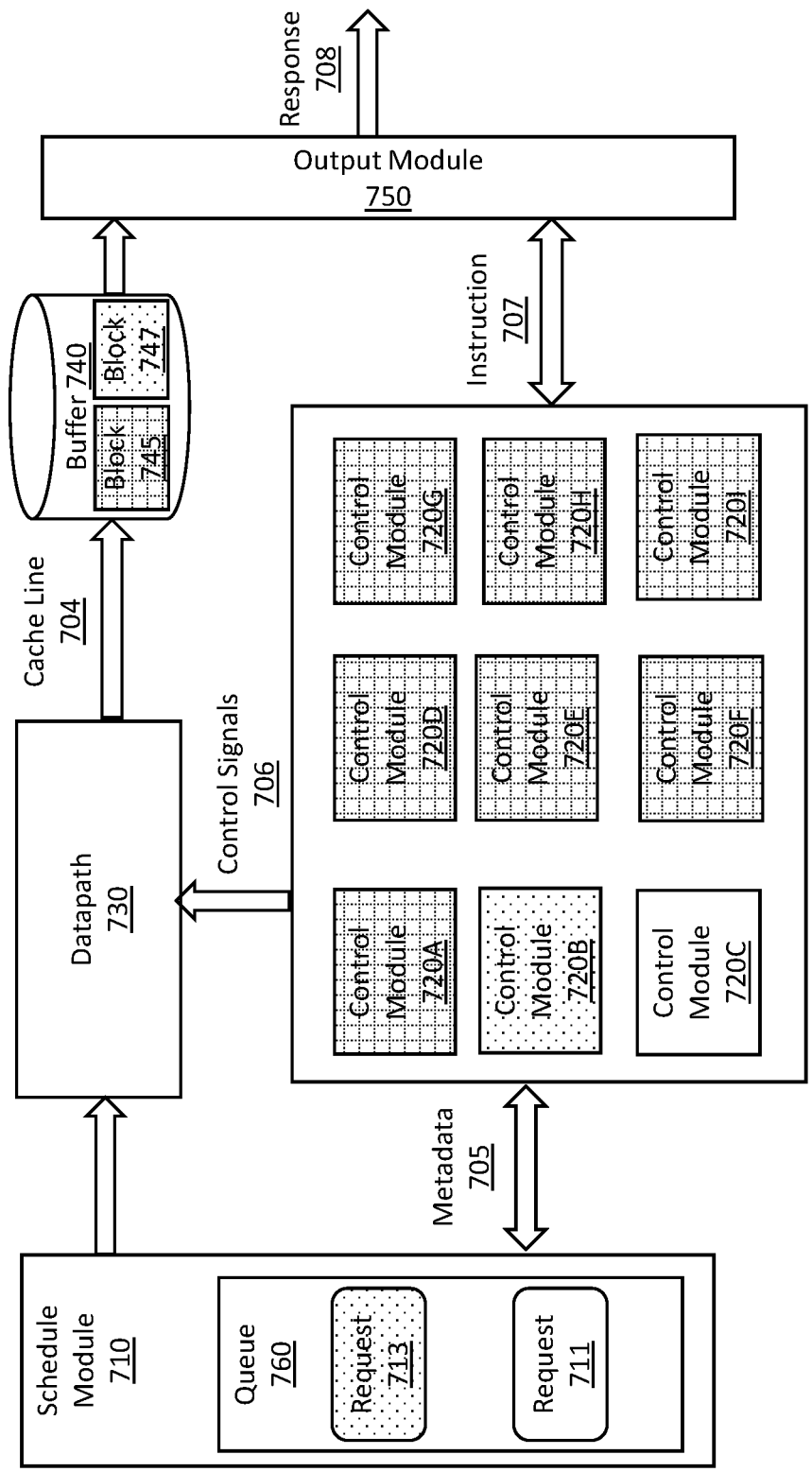

In FIG. 7C, the request 712 is removed from the queue 760. The schedule module 710 may remove the request 712 after it is assigned to the control module 720A. The request 713 becomes the first request in the queue, and the schedule module 710 processes the request 713. The request 713 is a request of reading a cache line 704 from the cache memory 700. In the embodiment of FIG. 7B, the schedule module 710 determines that the request 713 falls under the category associated with the control modules 720B-C and that the control module 720B is idle. The control module 720A is in its active mode, as it is controlling the execution of the request 712. Further, the schedule module 710 determines that the buffer 740 includes a block 747 that is empty (i.e., does not store any data at the time) and has a sufficient storage space to store the cache line 704 of the request 713. The block 745 is now storing the cache line 701 of the request 712. Based on the determinations, the schedule module 710 assigns the request 713 to the control module 720B. The schedule module 710 sends metadata 705 of the request 713 to the control module 720B. The metadata 705 includes address information of the cache line 704 in a main memory, e.g., the main memory 130, a size of the cache line 704, or other information of the request 713.

The control module 720B, after receiving the metadata 705, generates control signals based on the metadata 705. The control module 720B sends the control signals 706 to the datapath 730. The datapath 730 executes the request 713 based on the control signals 706. The datapath 730 reads the cache line 704, which is then transferred to the buffer 740, particularly to the block 747 where the cache line 704 is temporarily stored. The control module 720B sends an instruction 707 to the output module 750 for instruction the output module 750 to output a response 708. The response 708 is a response of the cache memory 700 for the requests 712 and 713. The output module 750, in accordance with the instruction 707, retrieves the cache lines 701 and 704 from the buffer 740 and outputs the cache lines 701 and 704, e.g., to the processor or agent that requests the read of the cache lines 701 and 704.

In the embodiment of FIGS. 7B and 7C, the datapath 730 executes the requests 712 and 713 in parallel, i.e., the two requests 712 and 713 are executed through the same datapath 730, even though they may be performed at different times. Data (e.g., the cache lines 701 and 704) to be output by the output module 750 can be temporary stored to prevent Head-Of-The-Line blocking or deadlock of the datapath 730. That way, parallel datapath executions can be done through a single datapath. Compared with cache memories that uses multiple datapaths to execute multiple caching requests, the cache memory 700 reduces consumption of resources, e.g., consumption of hardware components to form multiple datapaths, consumption of computing resources to operate multiple datapaths, etc. Further, the control module 720A can control the execution of the request 712 by the datapath 730 from start to end, and the control module 720B can control the execution of the request 713 by the datapath 730 from start to end. That way, the two datapath executions can be done through separate control paths. Compared with conventional cache memories that uses multiple controllers for a single datapath execution, the cache memory 700 just needs to configure one controller for a single datapath execution, versus the conventional cache memories need to configure multiple controllers for a single datapath execution. Thus, the cache memory 700 provides more flexibility.

Figure 7D:
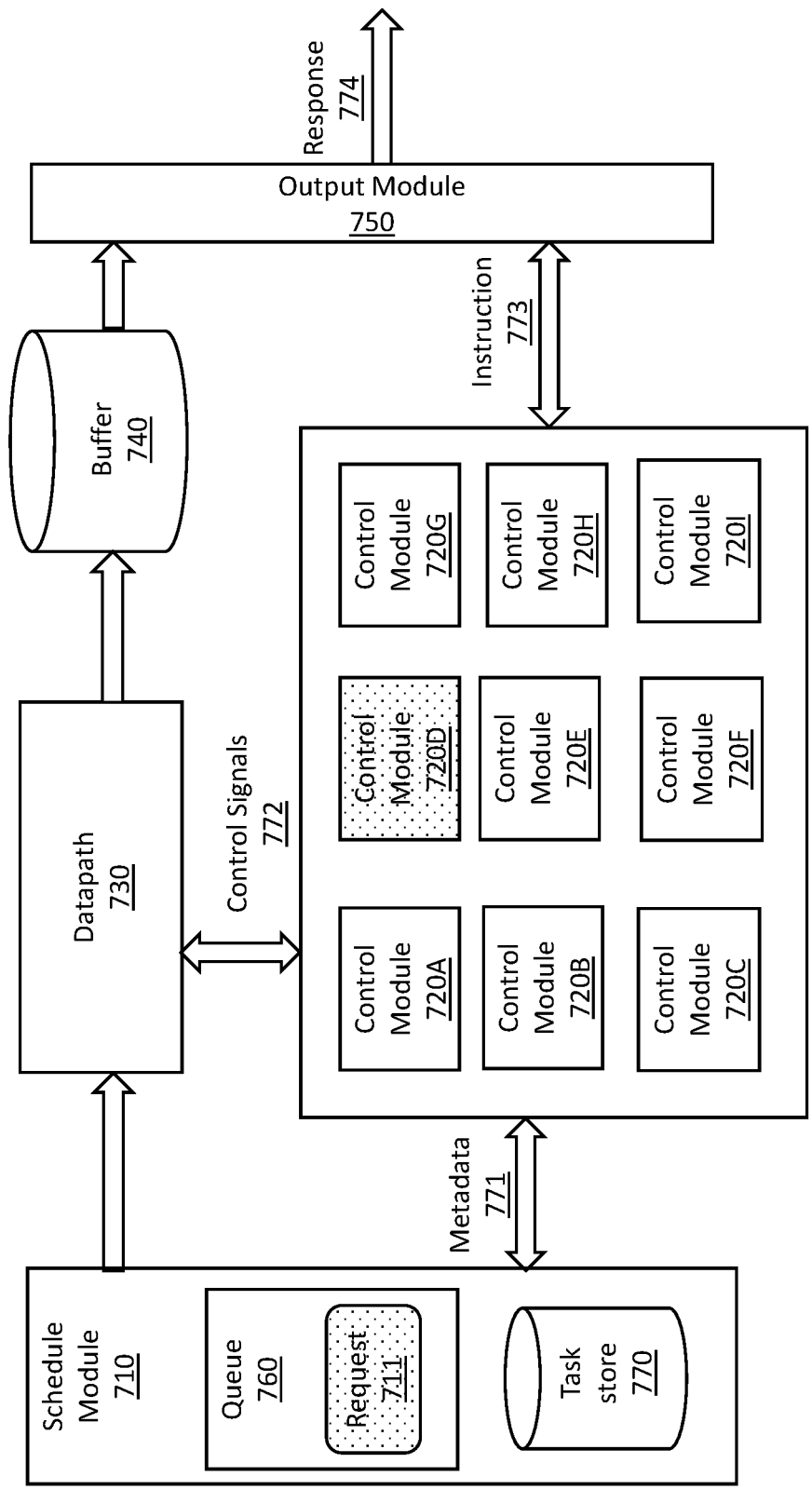

In FIG. 7D, the request 713 is removed from the queue 760. The request 711 becomes the first request in the queue 760 and the schedule module processing the request 711. The request 713 is a request of reading a cache line from the cache memory 700. In the embodiment of FIG. 7D, the control modules 720D-I are idle and the schedule module 710 assigns the request 711 to the control module 720D. The schedule module 710 sends metadata 771 of the request 711 to the control module 720D. The metadata 771 includes address information of the cache line in a main memory, e.g., the main memory 130, a size of the cache line, or other information of the request 713. The control module 720D, after receiving the metadata 771, generates control signals 772 based on the metadata 771. The control module 720D sends the control signals 772 to the datapath 730. The datapath 730 executes the request 711 based on the control signals 772. However, a cache miss occurs and the datapath 730 fails to match the address information with any of the tags in the tag array. The datapath 730 may provide a notification of the failure to the control module 730D. The control module 730D may further provide the notification of the failure to the schedule module 710. The schedule module 710, after receiving the notification, may store information (e.g., the metadata 771) of the request 711 in the request store 770. The control module 730D may also send an instruction 773 to the output module 750 to instruct the output module 750 to send out a response 774, e.g., to the processor or agent that sent the request 711 to the cache memory 700. The response 774 may indicate the cache miss. The processor or agent, after receiving the response 774, may initiate a new request, e.g., a request of writing the cache line to the cache memory 700. Additionally or alternatively, the schedule module 710 may re-assign the request 711 after getting a response from the processor or agent regarding the request 711. The response from the processor or agent may indicate that the cache line has been written to the cache memory 700.

Figure 7E:
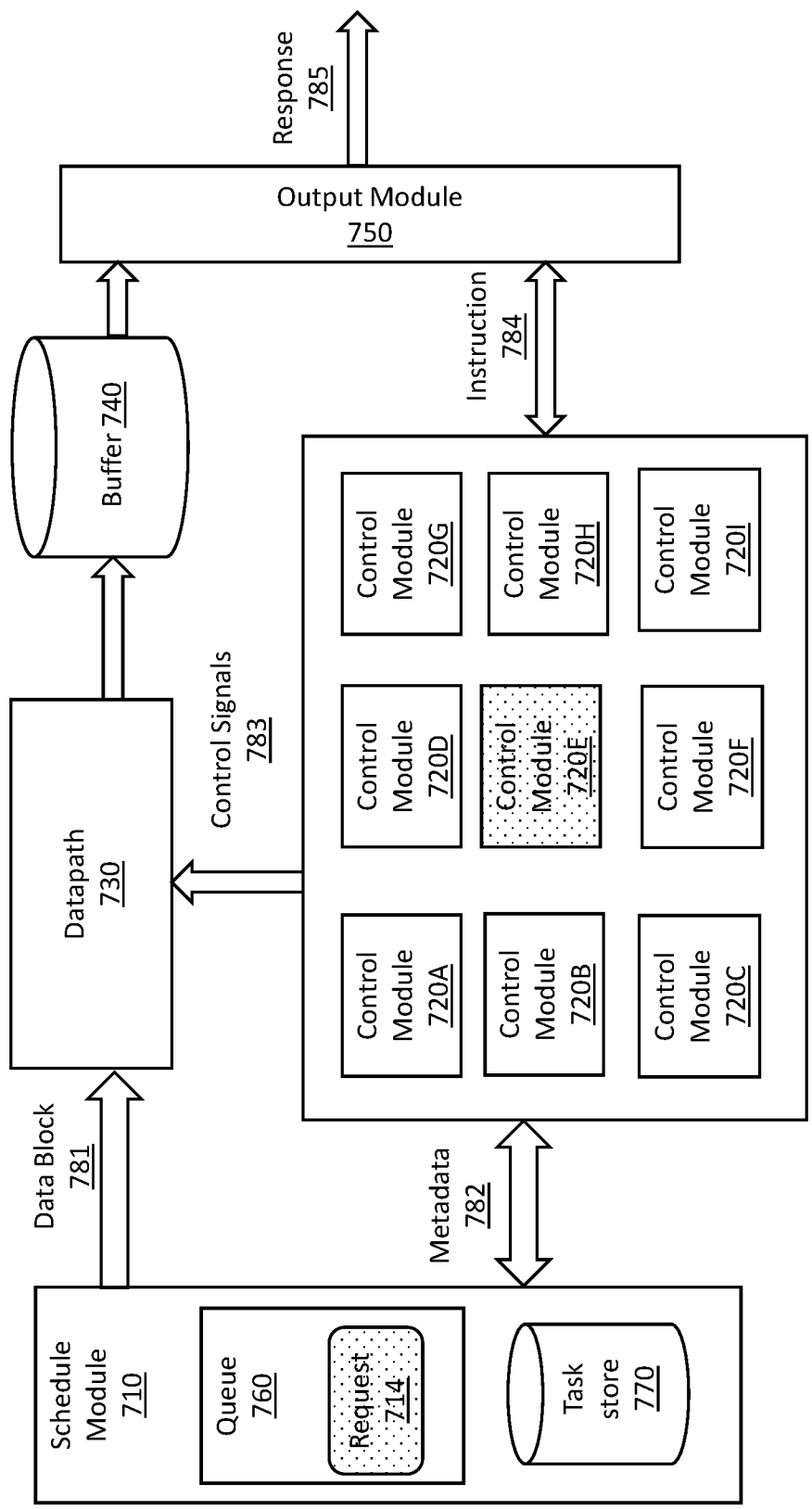

In FIG. 7E, a new request 714 is shown in the queue 760. The request 714 is the request of writing a data block 781 to the cache memory 700. The data block 781 includes the data of the cache line of the request 711. The schedule module 710 assigns the request 714 to the control module 720E. Also, as shown in FIG. 7E, the schedule module 710 sends the data block 781 to the datapath 730 and sends the metadata 782 to the control module 720E. Some or all the metadata 782 may be the information of the request 711 that was stored in the request store 770, and the schedule module 710 may retrieve the information from the request store 770 or instruct the control module 720E to retrieve the information from the request store 770. The control module 720E generates control signals 783 based on the metadata 782 and provides the control signals 783 to the datapath 730. Based on the control signals 783, the datapath 730 writes the data block 781, which becomes a new cache line of the cache memory 700. The control module 720E, after determining that the write of the data block 781 is done, sends an instruction 784 to the output module 750. The output module 750 outputs a response 785 based on the instruction 784. The response 785 may indicate that the data block 781 is stored in the cache memory 700 and may be sent to the processor or agent that initiates the request 714. The processor or agent, after receiving the response 785, may initiate a new request, e.g., a request of reading the new cache line from the cache memory 700.

Figure 7F:
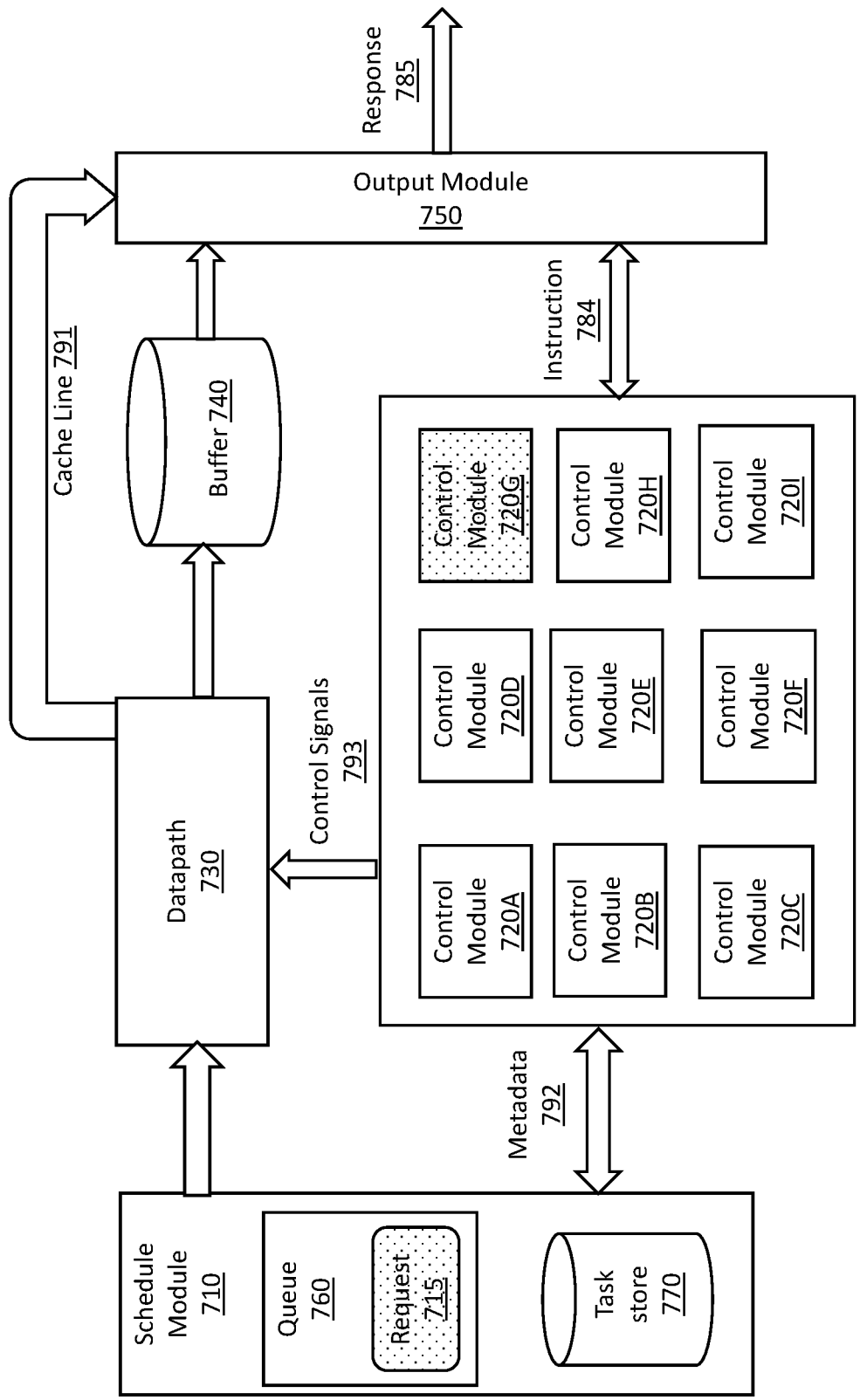

In FIG. 7F, a new request 715 is shown in the queue 760. The request 715 is the request of reading the new cache line, i.e., cache line 791, from the cache memory 700. The schedule module 710 assigns the request 715 to the control module 720G. The schedule module 710 sends the metadata 792 of the request 715 to the control module 720G. Some or all the metadata 782 may be the information of the request 711 that was stored in the request store 770, and the schedule module 710 may retrieve the information from the request store 770 or instruct the control module 720G to retrieve the information from the request store 770. The control module 720G generates control signals 793 based on the metadata 792 and provides the control signals 793 to the datapath 730. Based on the control signals 793, the datapath 730 reads the cache line 791. In the embodiment of FIG. 7F, the cache line 791 is sent from the datapath 730 to the output module 750 directly and is not stored in the buffer 740. That may be because the schedule module 710 or control module 720G determines that there would not be deadlock in the datapath 730 even if the cache line 791 is not stored in the buffer before the output module 750 outputs the cache line 791. The schedule module 710 may not determine whether the buffer 740 has sufficient free storage space for the cache line 791 before it assigns the request 715 to the control module 720G. The control module 720G sends an instruction 794 to the output module 750. The output module 750 outputs a response 795 based on the instruction 794. The response 795 includes the cache line 791 and may be sent to the processor or agent that initiates the request 715. Even though not shown in FIG. 7F, the queue may include new caching requests received by the schedule module 710.

Example Method of Caching Data

Figure 8:
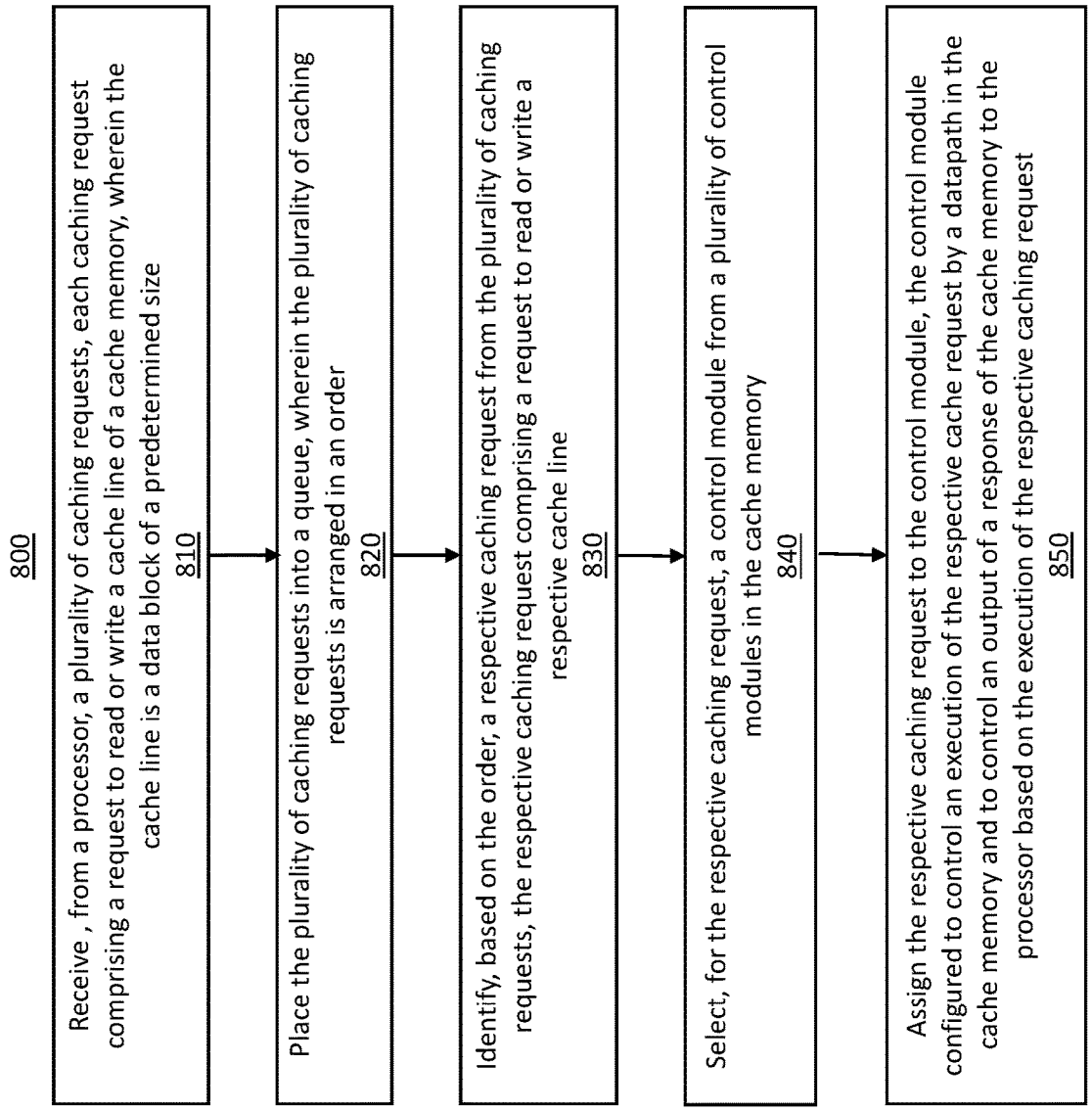
FIG. 8 is a flowchart showing an example method for caching data, in accordance with various embodiments.

FIG. 8 is a flowchart showing an example method 800 for caching data, in accordance with various embodiments. The method 800 may be performed by the schedule module 210 described above in conjunction with FIGS. 2 and 3. Although the method 800 is described with reference to the flowchart illustrated in FIG. 8, many other methods of caching data may alternatively be used. For example, the order of execution of the steps in FIG. 8 may be changed. As another example, some of the steps may be changed, eliminated, or combined.

The schedule module 210 receives 810, from a processing device, a plurality of caching requests. Each caching request includes a request to read or write a cache line of a cache memory, e.g., the cache memory 120. A cache line is a data block of a predetermined size.

The schedule module 210 places 820 the plurality of caching requests into a queue. The plurality of caching requests is arranged in an order in the queue. The schedule module 210 identifies 830, based on the order, a respective caching request from the plurality of caching requests. The respective caching request includes a request to read or write a respective cache line.

The schedule module 210 selects 840, for the respective caching request, a control module from a plurality of control modules in the cache memory. In some embodiments, the schedule module 210 may determining whether the control module is not being assigned to other caching requests, and after determining that the control module is not being assigned to other caching requests, the schedule module 210 selects the control module for the respective caching request. In some embodiments, the schedule module 210 may associate a subset of the plurality of control modules with a category of caching requests. The schedule module 210 may determine whether the respective caching request falls in the category. In embodiments where the respective caching request falls in the category, the schedule module 210 may select the control module from the subset. In embodiments where the respective caching request does not fall in the category, the schedule module 210 may select the control module from control modules that are not in the subset.

The schedule module 210 assigns 850 the respective caching request to the control module. The control module is configured to control an execution of the respective cache request by a datapath in the cache memory and to control an output of a response of the cache memory to the processing device based on the execution of the respective caching request. In some embodiments, the schedule module 210 determines whether a buffer in the cache memory has sufficient free storage space to store the respective cache line before the respective caching request is assigned to the control module. The buffer is configured to store the respective cache line before the output of the response.

The schedule module 210 may assign the respective caching request to the control module after it determines that the buffer has sufficient free storage space to store the respective cache line. In embodiments where the schedule module 210 determines that the buffer lacks sufficient free storage space to store the respective cache line, the schedule module 210 may not assign the respective caching request to the control module. Rather, the schedule module 210 may leave the respective caching request in the queue and proceed to process another caching request in the queue. The schedule module 210 may also change the position of the respective caching request in the queue, e.g., by placing the respective caching request after one or more other caching requests in the queue.

In some embodiments, the respective caching request may include metadata, such as address information of the respective caching line in a main memory, e.g., the main memory 130. The schedule module 210 may send the address information to the control module. The address information indicates an address of the respective cache line in a main memory that is coupled to the cache memory. The datapath, when executing the respective caching request, may identify a tag in a tag array of the datapath based on the address information and read the respective cache line from a data array of the datapath based on the identified tag. The control module provides the datapath control signals, based on which the datapath identifies the tag and reads the cache line.

In some embodiments, the schedule module 210 removes the respective caching request from the queue after it assigns the respective caching request to the control module. The schedule module 210 may remove the respective caching request from the queue after the schedule module 210 receives a notification from the control module that the execution of the respective caching request is completed, a response of the cache memory to the respective caching request has been sent out, or the execution of the respective caching request has been failed. The schedule module 210 may also update the state of the control module, e.g., to an idle state, so that the control module will be available to receive another caching request. In some embodiments, such as embodiments where the schedule module 210 receives a notification from the control module that the execution of the respective caching request has been failed, the schedule module 210 may store information of the respective caching request, e.g., in a datastore (such as the request store 340), so that the information can be used for reading or writing the respective cache line through an execution of a new caching request.

The schedule module 210 may assign multiple caching requests to multiple control modules, which can control parallel executions of the caching requests by the datapath. In an example, the schedule module 210 selects, for an additional caching request in the queue, an additional control module from the plurality of control modules. The additional caching request includes a request to read or write an additional cache line. The schedule module 210 assigns the additional caching request to the additional control module. The additional control module is configured to control an execution of the additional cache request by the datapath. The execution of the respective cache request comprises a flow of the respective cache line through at least part of the datapath. The execution of the additional cache request comprises a flow of the additional cache line through at least part of the datapath. The flow of the respective cache line is in parallel with the flow of the additional cache line. The respective cache line may be stored in a buffer in the cache memory after the execution of the respective cache request and before execution of the additional cache request. The additional cache line may be stored in the buffer after the execution of the additional cache request. The cache memory may output, e.g., to the processing device, a response that includes the respective cache line and the additional cache line that are retrieved from the buffer. With the buffer, deadlock in the datapath during the parallel execution of multiple caching requests can be avoided.

Example AI System

Figure 9:
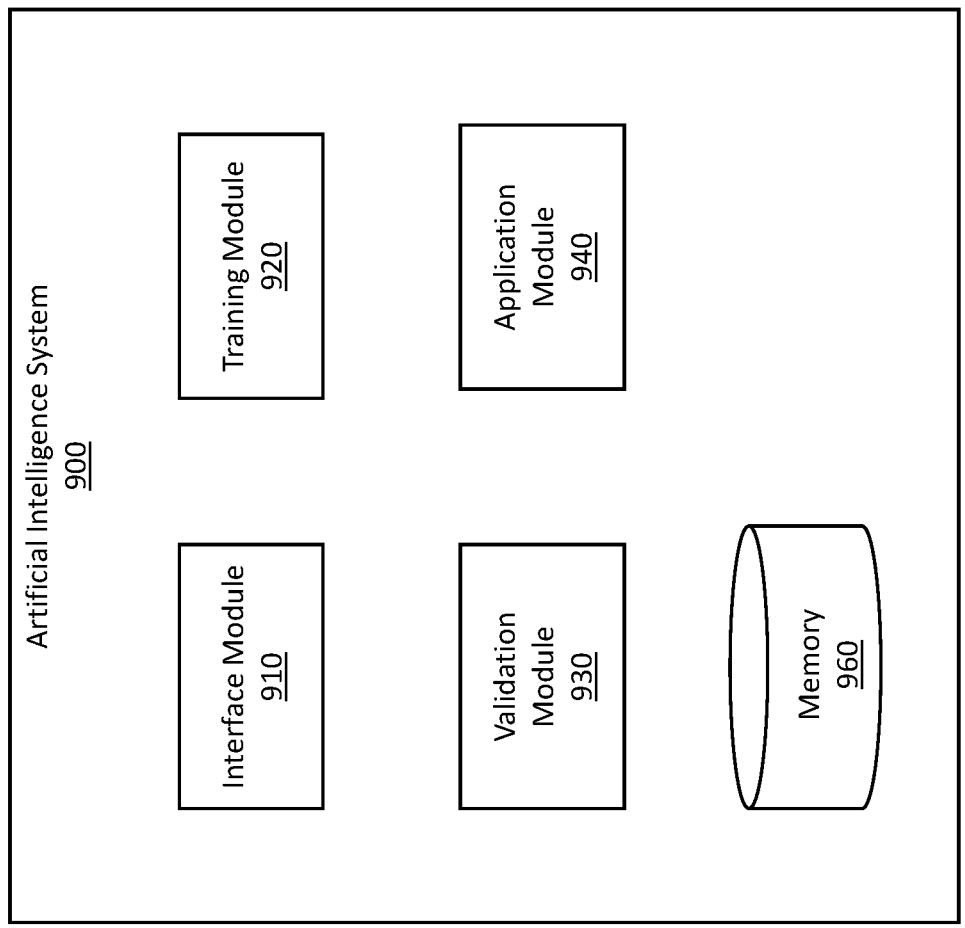
FIG. 9 is a block diagram of an example artificial intelligence (AI) system, in accordance with various embodiments.

FIG. 9 is a block diagram of an example AI system 900, in accordance with various embodiments. The whole AI system 900 or a part of the AI system 900 may be implemented in the computer system 100. The AI system 900 trains deep neural networks (DNNs) for various tasks, such as image classification, learning relationships between biological cells (e.g., DNA, proteins, etc.), control behaviors for devices (e.g., robots, machines, etc.), and so on. The AI system 900 includes an interface module 910, a training module 920, a validation module 930, an inference module 940, and a memory 950. In other embodiments, alternative configurations, different or additional components may be included in the AI system 900. Further, functionality attributed to a component of the AI system 900 may be accomplished by a different component included in the AI system 900 or a different system. The AI system 900 or a component of the AI system 900 (e.g., the training module 920 or inference module 940) may include the computer system 90 in FIG. 1.

The interface module 910 facilitates communications of the AI system 900 with other systems. For example, the interface module 910 establishes communications between the AI system 900 with an external database to receive data that can be used to train DNNs or input into DNNs to perform tasks. As another example, the interface module 910 supports the AI system 900 to distribute DNNs to other systems, e.g., computing devices configured to apply DNNs to perform tasks.

The training module 920 trains DNNs by using a training dataset. The training module 920 forms the training dataset. In an embodiment where the training module 920 trains an DNN to recognize objects in images, the training dataset includes training images and training labels. The training labels describe ground truth classifications of objects in the training images. In some embodiments, each label in the training dataset corresponds to an object in a training image. In some embodiments, a part of the training dataset may be used to initially train the DNN, and the rest of the training dataset may be held back as a validation subset used by the validation module 930 to validate performance of a trained DNN. The portion of the training dataset not including the tuning subset and the validation subset may be used to train the DNN.

The training module 920 also determines hyperparameters for training the DNN. Hyperparameters are variables specifying the DNN training process. Hyperparameters are different from parameters inside the DNN (e.g., weights of filters). In some embodiments, hyperparameters include variables determining the architecture of the DNN, such as number of hidden layers, etc. Hyperparameters also include variables which determine how the DNN is trained, such as batch size, number of epochs, etc. A batch size defines the number of training samples to work through before updating the parameters of the DNN. The batch size is the same as or smaller than the number of samples in the training dataset. The training dataset can be divided into one or more batches. The number of epochs defines how many times the entire training dataset is passed forward and backwards through the entire network. The number of epochs defines the number of times that the deep learning algorithm works through the entire training dataset. One epoch means that each training sample in the training dataset has had an opportunity to update the parameters inside the DNN. An epoch may include one or more batches. The number of epochs may be 9, 90, 500, 900, or even larger.

The training module 920 defines the architecture of the DNN, e.g., based on some of the hyperparameters. The architecture of the DNN includes an input layer, an output layer, and a plurality of hidden layers. The input layer of an DNN may include tensors (e.g., a multidimensional array) specifying attributes of the input image, such as the height of the input image, the width of the input image, and the depth of the input image (e.g., the number of bits specifying the color of a pixel in the input image). The output layer includes labels of objects in the input layer. The hidden layers are layers between the input layer and output layer. The hidden layers include one or more convolutional layers and one or more other types of layers, such as pooling layers, fully connected layers, normalization layers, softmax or logistic layers, and so on. The convolutional layers of the DNN abstract the input image to a feature map that is represented by a tensor specifying the feature map height, the feature map width, and the feature map channels (e.g., red, green, blue images include three channels). A pooling layer is used to reduce the spatial volume of input image after convolution. It is used between two convolution layers. A fully connected layer involves weights, biases, and neurons. It connects neurons in one layer to neurons in another layer. It is used to classify images between different category by training.

In the process of defining the architecture of the DNN, the training module 920 also adds an activation function to a hidden layer or the output layer. An activation function of a layer transforms the weighted sum of the input of the layer to an output of the layer. The activation function may be, for example, a rectified linear unit activation function, a tangent activation function, or other types of activation functions.

After the training module 920 defines the architecture of the DNN, the training module 920 inputs a training dataset into the DNN. The training dataset includes a plurality of training samples. An example of a training sample includes an object in an image and a ground truth label of the object. The training module 920 modifies the parameters inside the DNN ("internal parameters of the DNN") to minimize the error between labels of the training objects that are generated by the DNN and the ground truth labels of the objects. The internal parameters include weights of filters in the convolutional layers of the DNN. In some embodiments, the training module 920 uses a cost function to minimize the error.

The training module 920 may train the DNN for a predetermined number of epochs. The number of epochs is a hyperparameter that defines the number of times that the DL algorithm will work through the entire training dataset. One epoch means that each sample in the training dataset has had an opportunity to update internal parameters of the DNN. After the training module 920 finishes the predetermined number of epochs, the training module 920 may stop updating the parameters in the DNN. The DNN having the updated parameters is referred to as a trained DNN.

The validation module 930 verifies accuracy of trained DNNs. In some embodiments, the validation module 930 inputs samples in a validation dataset into a trained DNN and uses the outputs of the DNN to determine the model accuracy. In some embodiments, a validation dataset may be formed of some or all the samples in the training dataset. Additionally or alternatively, the validation dataset includes additional samples, other than those in the training sets. In some embodiments, the validation module 930 determines may determine an accuracy score measuring the precision, recall, or a combination of precision and recall of the DNN. The validation module 930 may use the following metrics to determine the accuracy score: Precision=TP/(TP+FP) and Recall=TP/(TP+FN), where precision may be how many the reference classification model correctly predicted (TP or true positives) out of the total it predicted (TP+FP or false positives), and recall may be how many the reference classification model correctly predicted (TP) out of the total number of objects that did have the property in question (TP+FN or false negatives). The F-score (F-score=2*PR/(P+R)) unifies precision and recall into a single measure.

The validation module 930 may compare the accuracy score with a threshold score. In an example where the validation module 930 determines that the accuracy score of the augmented model is lower than the threshold score, the validation module 930 instructs the training module 920 to re-train the DNN. In one embodiment, the training module 920 may iteratively re-train the DNN until the occurrence of a stopping condition, such as the accuracy measurement indication that the DNN may be sufficiently accurate, or a number of training rounds having taken place.

The inference module 940 applies the trained or validated DNN to perform tasks. For instance, the inference module 940 inputs images into the DNN. The DNN outputs classifications of objects in the images. As an example, the DNN may be provisioned in a security setting to detect malicious or hazardous objects in images captured by security cameras. As another example, the DNN may be provisioned to detect objects (e.g., road signs, hazards, humans, pets, etc.) in images captured by cameras of an autonomous vehicle. The input to the DNN may be formatted according to a predefined input structure mirroring the way that the training dataset was provided to the DNN. The DNN may generate an output structure which may be, for example, a classification of the image, a listing of detected objects, a boundary of detected objects, or the like. In some embodiments, the inference module 940 distributes the DNN to other systems, e.g., computing devices in communication with the AI system 900, for the other systems to apply the DNN to perform the tasks.

The memory 950 stores data received, generated, used, or otherwise associated with the AI system 900. For example, the memory 950 stores the datasets used by the training module 920 and validation module 930. The memory 950 may also store data generated by the training module 920 and validation module 930, such as the hyperparameters for training DNNs, internal parameters of trained DNNs (e.g., values of tunable parameters of FALUs), etc. In the embodiment of FIG. 9, the memory 950 is a component of the AI system 900. In other embodiments, the memory 950 may be external to the AI system 900 and communicate with the AI system 900 through a network.

Example Computing Device

Figure 10:
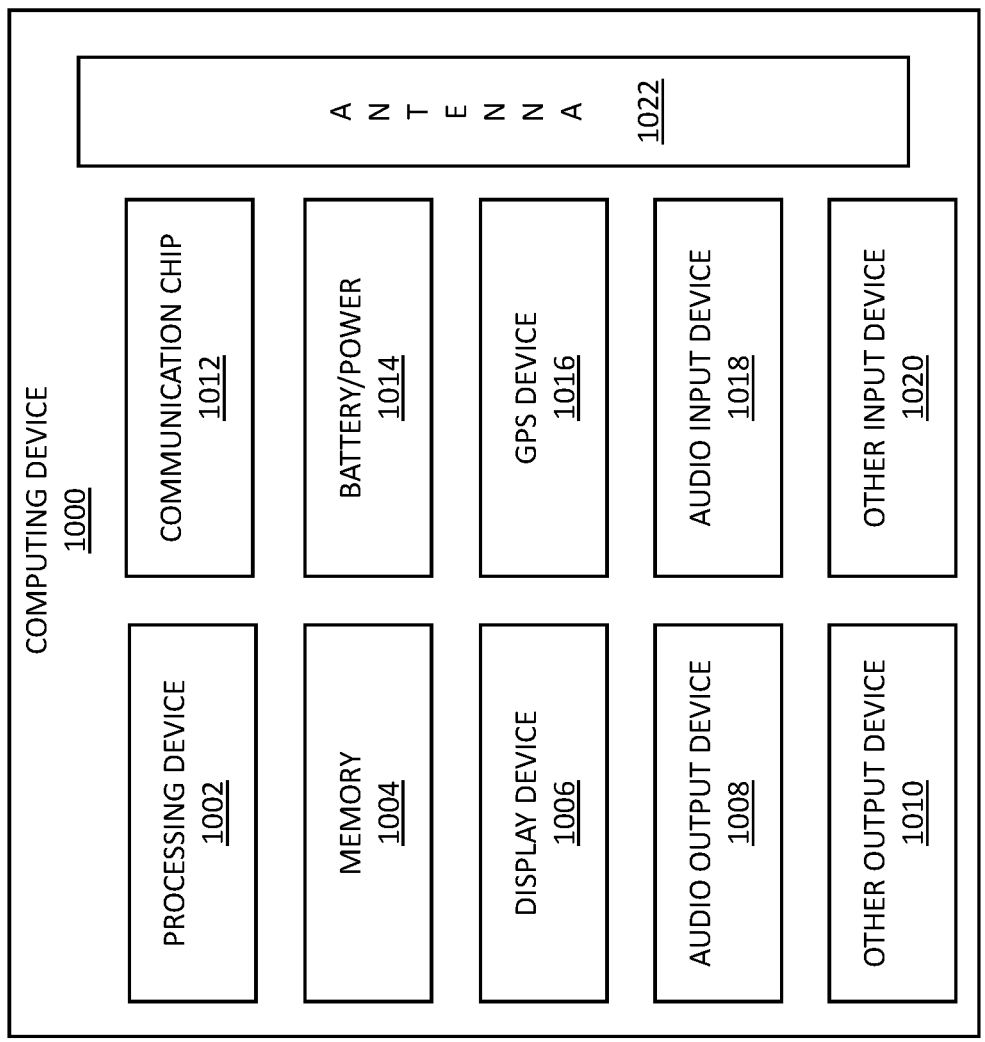
FIG. 10 is a block diagram of an example computing device, in accordance with various embodiments.

FIG. 10 is a block diagram of an example computing device 1000, in accordance with various embodiments. The computing device 1000 may be an embodiment of the computer system 100 in FIG. 1, or an embodiment of a part of the computer system 100. In some embodiments, the computing device 1000 can be used as the AI system 900 in FIG. 9. A number of components are illustrated in FIG. 10 as included in the computing device 1000, but any one or more of these components may be omitted or duplicated, as suitable for the application. In some embodiments, some or all of the components included in the computing device 1000 may be attached to one or more motherboards. In some embodiments, some or all of these components are fabricated onto a single system on a chip (SoC) die. Additionally, in various embodiments, the computing device 1000 may not include one or more of the components illustrated in FIG. 10, but the computing device 1000 may include interface circuitry for coupling to the one or more components. For example, the computing device 1000 may not include a display device 1006, but may include display device interface circuitry (e.g., a connector and driver circuitry) to which a display device 1006 may be coupled. In another set of examples, the computing device 1000 may not include an audio input device 1018 or an audio output device 1008, but may include audio input or output device interface circuitry (e.g., connectors and supporting circuitry) to which an audio input device 1018 or audio output device 1008 may be coupled.

The computing device 1000 may include a processing device 1002 (e.g., one or more processing devices). The processing device 1002 processes electronic data from registers and/or memory to transform that electronic data into other electronic data that may be stored in registers and/or memory. An embodiment of the processing device 1002 may be the processing device 110 in FIG. 1. The computing device 1000 may include a memory 1004, which may itself include one or more memory devices such as volatile memory (e.g., DRAM), nonvolatile memory (e.g., read-only memory (ROM)), high bandwidth memory (HBM), flash memory, solid state memory, and/or a hard drive. In some embodiments, the memory 1004 may include memory that shares a die with the processing device 1002. In some embodiments, the memory 1004 includes one or more non-transitory computer-readable media storing instructions executable to perform operations for caching data. The instructions stored in the one or more non-transitory computer-readable media may be executed by the processing device 1002.

In some embodiments, the computing device 1000 may include a communication chip 1012 (e.g., one or more communication chips). For example, the communication chip 1012 may be configured for managing wireless communications for the transfer of data to and from the computing device 1000. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 1012 may implement any of a number of wireless standards or protocols, including but not limited to Institute for Electrical and Electronic Engineers (IEEE) standards including Wi-Fi (IEEE 802.10 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for worldwide interoperability for microwave access, which is a certification mark for products that pass conformity and interoperability tests for the IEEE 802.16 standards. The communication chip 1012 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 1012 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1012 may operate in accordance with code-division multiple access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1012 may operate in accordance with other wireless protocols in other embodiments. The computing device 1000 may include an antenna 1022 to facilitate wireless communications and/or to receive other wireless communications (such as AM or FM radio transmissions).

In some embodiments, the communication chip 1012 may manage wired communications, such as electrical, optical, or any other suitable communication protocols (e.g., the Ethernet). As noted above, the communication chip 1012 may include multiple communication chips. For instance, a first communication chip 1012 may be dedicated to shorter-range wireless communications such as Wi-Fi or Bluetooth, and a second communication chip 1012 may be dedicated to longer-range wireless communications such as global positioning system (GPS), EDGE, GPRS, CDMA, WiMAX, LTE, EV-DO, or others. In some embodiments, a first communication chip 1012 may be dedicated to wireless communications, and a second communication chip 1012 may be dedicated to wired communications.

The computing device 1000 may include battery/power circuitry 1014. The battery/power circuitry 1014 may include one or more energy storage devices (e.g., batteries or capacitors) and/or circuitry for coupling components of the computing device 1000 to an energy source separate from the computing device 1000 (e.g., AC line power).

The computing device 1000 may include a display device 1006 (or corresponding interface circuitry, as discussed above). The display device 1006 may include any visual indicators, such as a heads-up display, a computer monitor, a projector, a touchscreen display, a liquid crystal display (LCD), a light-emitting diode display, or a flat panel display, for example.

The computing device 1000 may include an audio output device 1008 (or corresponding interface circuitry, as discussed above). The audio output device 1008 may include any device that generates an audible indicator, such as speakers, headsets, or earbuds, for example.

The computing device 1000 may include an audio input device 1018 (or corresponding interface circuitry, as discussed above). The audio input device 1018 may include any device that generates a signal representative of a sound, such as microphones, microphone arrays, or digital instruments (e.g., instruments having a musical instrument digital interface (MIDI) output).

The computing device 1000 may include a GPS device 1016 (or corresponding interface circuitry, as discussed above). The GPS device 1016 may be in communication with a satellite-based system and may receive a location of the computing device 1000, as known in the art.

The computing device 1000 may include an other output device 1010 (or corresponding interface circuitry, as discussed above). Examples of the other output device 1010 may include an audio codec, a video codec, a printer, a wired or wireless transmitter for providing information to other devices, or an additional storage device.

The computing device 1000 may include an other input device 1020 (or corresponding interface circuitry, as discussed above). Examples of the other input device 1020 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (register fileID) reader.

The computing device 1000 may have any desired form factor, such as a handheld or mobile computer system (e.g., a cell phone, a smart phone, a mobile internet device, a music player, a tablet computer, a laptop computer, a netbook computer, an ultrabook computer, a personal digital assistant (PDA), an ultramobile personal computer, etc.), a desktop computer system, a server or other networked computing component, a printer, a scanner, a monitor, a set-top box, an entertainment control unit, a vehicle control unit, a digital camera, a digital video recorder, or a wearable computer system. In some embodiments, the computing device 1000 may be any other electronic device that processes data.

SELECT EXAMPLES

The following paragraphs provide various examples of the embodiments disclosed herein.

Example 1 provides a cache memory, including a datapath configure to execute caching requests, an execution of a caching request including reading or writing a cache line, where the cache line is a data block of a predetermined size; a plurality of control modules configured to provide control signals to the datapath for controlling executions of the caching requests by the datapath; a schedule module configured to receive, from a processing device, the caching requests, maintain a queue of the caching requests, and for a respective caching request for reading or writing a respective cache line, assign the respective caching request to a control module of the plurality of control module based on the queue, the control module configured to control an execution of the respective cache request by the datapath; and an output module configured to receive an instruction from the control module, and send the processing device a response of the cache memory to the respective caching request based on the instruction from the control module.

Example 2 provides the cache memory of example 1, further including a buffer configured to store one or more cache lines after the datapath reads or writes the one or more cache lines.

Example 3 provides the cache memory of example 2, where the schedule module is further configured to determine whether the buffer has sufficient free storage space to store the respective cache line before schedule module assigns the respective caching request to the control module.

Example 4 provides the cache memory of example 1, where the schedule module is configured to assign the respective caching request to the control module by determining that the control module is not being assigned to other caching requests.

Example 5 provides the cache memory of example 1, where the schedule module is configured to associate a subset of the plurality of control modules with a category of caching requests, and the schedule module is configured to assign the respective caching request to the control module by determining that the respective caching request is not in the category and that the control module is not in the subset.

Example 6 provides the cache memory of example 1, where the datapath includes a data array configured to store a plurality of cache lines; and a tag array configured to store a plurality of tags, each tag indicating an address of one of the plurality of cache lines in a main memory that is coupled to the cache memory.

Example 7 provides the cache memory of example 6, where the respective caching request includes address information indicating an address of the respective cache line in the main memory, and the execution of the respective cache request by the datapath includes a first stage, including identifying a tag in the tag array based on the address information, and a second stage, including reading the respective cache line from the data array based on the identified tag.

Example 8 provides the cache memory of example 7, where the control module is configured to control the execution of the respective cache request by the datapath by providing one or more control signals to control the first stage and the second stage.

Example 9 provides the cache memory of example 1, where the schedule module is further configured to assign different caching requests in the queue to different control modules of the plurality of control module, the different control modules configured to control parallel flows of cache lines associated with the different caching requests through the datapath.

Example 10 provides the cache memory of example 1, where the response includes the respective cache line or a request from the cache memory to transfer the cache line from a main memory to the cache memory.

Example 11 provides a method, including receiving, from a processing device, a plurality of caching requests, each caching request including a request to read or write a cache line of a cache memory, where the cache line is a data block of a predetermined size; placing the plurality of caching requests into a queue, where the plurality of caching requests is arranged in an order; identifying, based on the order, a respective caching request from the plurality of caching requests, the respective caching request including a request to read or write a respective cache line; selecting, for the respective caching request, a control module from a plurality of control modules in the cache memory; and assigning the respective caching request to the control module, the control module configured to control an execution of the respective cache request by a datapath in the cache memory and to control an output of a response of the cache memory to the processing device based on the execution of the respective caching request.

Example 12 provides the method of example 11, further including determining whether a buffer in the cache memory has sufficient free storage space to store the respective cache line before the respective caching request is assigned to the control module.

Example 13 provides the method of example 12, where the buffer is configured to store the respective cache line before the output of the response.

Example 14 provides the method of example 11, where selecting the control module from the plurality of control modules includes determining whether the control module is not being assigned to other caching requests; and after determining that the control module is not being assigned to other caching requests, selecting the control module.

Example 15 provides the method of example 11, further including associating a subset of the plurality of control modules with a category of caching requests, where selecting the control module from the plurality of control modules includes determining that the respective caching request is not in the category; and determining that the control module is not in the subset.

Example 16 provides the method of example 11, where assigning the respective caching request to the control module includes sending address information to the control module, the address information indicates an address of the respective cache line in a main memory that is coupled to the cache memory, and the control module is configured to control the execution of the respective cache request by the datapath by controlling the datapath to identify a tag in a tag array of the datapath based on the address information, and controlling the datapath to read the respective cache line from a data array of the datapath based on the identified tag.

Example 17 provides the method of example 11, further including removing the respective caching request from the queue after assigning the respective caching request to the control module.

Example 18 provides the method of example 11, further including receiving a notification from the control module that the respective caching request failed; and after receiving the notification, storing information of the respective caching request, the information to be used for reading or writing the respective cache line through an execution of a new caching request.

Example 19 provides the method of example 11, further including selecting, for an additional caching request in the queue, an additional control module from the plurality of control modules, the additional caching request including a request to read or write an additional cache line; and assigning the additional caching request to the additional control module, the additional control module configured to control an execution of the additional cache request by the datapath, where the execution of the respective cache request includes a flow of the respective cache line through at least part of the datapath, the execution of the additional cache request includes a flow of the additional cache line through at least part of the datapath, and the flow of the respective cache line is in parallel with the flow of the additional cache line.

Example 20 provides the method of example 19, where the respective cache line is stored in a buffer in the cache memory after the execution of the respective cache request and before execution of the additional cache request, the additional cache line is stored in the buffer after the execution of the additional cache request, and the response includes the respective cache line and the additional cache line that are retrieved from the buffer.

Example 21 provides one or more non-transitory computer-readable media storing instructions executable to perform operations, the operations including receiving, from a processing device, a plurality of caching requests, each caching request including a request to read or write a cache line of a cache memory, where the cache line is a data block of a predetermined size; placing the plurality of caching requests into a queue, where the plurality of caching requests is arranged in an order; identifying, based on the order, a respective caching request from the plurality of caching requests, the respective caching request including a request to read or write a respective cache line; selecting, for the respective caching request, a control module from a plurality of control modules in the cache memory; and assigning the respective caching request to the control module, the control module configured to control an execution of the respective cache request by a datapath in the cache memory and to control an output of a response of the cache memory to the processing device based on the execution of the respective caching request.

Example 22 provides the one or more non-transitory computer-readable media of example 21, where the operations further include determining whether a buffer in the cache memory has sufficient free storage space to store the respective cache line before the respective caching request is assigned to the control module.

Example 23 provides the one or more non-transitory computer-readable media of example 21, where the operations further include associating a subset of the plurality of control modules with a category of caching requests, and selecting the control module from the plurality of control modules includes determining that the respective caching request is not in the category, and determining that the control module is not in the subset.

Example 24 provides the one or more non-transitory computer-readable media of example 21, where assigning the respective caching request to the control module includes sending address information to the control module, the address information indicates an address of the respective cache line in a main memory that is coupled to the cache memory, and the control module is configured to control the execution of the respective cache request by the datapath by controlling the datapath to identify a tag in a tag array of the datapath based on the address information, and controlling the datapath to read the respective cache line from a data array of the datapath based on the identified tag.

Example 25 provides the one or more non-transitory computer-readable media of example 21, where the operations further include receiving a notification from the control module that the respective caching request failed; and after receiving the notification, storing information of the respective caching request, the information to be used for reading or writing the respective cache line through an execution of a new caching request.

The above description of illustrated implementations of the disclosure is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

The invention claimed is:

1. A cache memory, comprising:
 a datapath configured to execute caching requests, an execution of a caching request comprising reading or writing a cache line, wherein the cache line is a data block of a predetermined size;
 a buffer configured to store the cache line after the datapath reads or writes the cache line;
 a plurality of control modules configured to provide control signals to the datapath for controlling executions of the caching requests by the datapath;
 a schedule module configured to:
  receive, from a processing device, the caching requests,
  maintain a queue of the caching requests, the queue indicating the order of execution of the caching requests, and
  for a respective caching request for reading or writing a respective cache line, assign the respective caching request to a control module of the plurality of control module based on the order, the control module configured to control an execution of the respective cache request by the datapath; and
 an output module configured to:
  receive an instruction from the control module, and
  send, to the processing device, a response of the cache memory for the respective caching request based on the instruction from the control module.

2. The cache memory of claim 1, wherein the schedule module is further configured to determine whether the buffer has sufficient free storage space to store the respective cache line before schedule module assigns the respective caching request to the control module.

3. The cache memory of claim 1, wherein the schedule module is configured to assign the respective caching request to the control module by determining that the control module is not being assigned to other caching requests.

4. The cache memory of claim 1, wherein the schedule module is configured to associate a subset of the plurality of control modules with a category of caching requests, and the schedule module is configured to assign the respective caching request to the control module by determining that the respective caching request is not in the category and that the control module is not in the subset.

5. The cache memory of claim 1, wherein the datapath comprises:
 a data array configured to store a plurality of cache lines; and
 a tag array configured to store a plurality of tags, each tag indicating an address of one of the plurality of cache lines in a main memory that is coupled to the cache memory.

6. The cache memory of claim 5, wherein the respective caching request includes address information indicating an address of the respective cache line in the main memory, and the execution of the respective cache request by the datapath comprises:
 a first stage, comprising identifying a tag in the tag array based on the address information, and
 a second stage, comprising reading the respective cache line from the data array based on the tag.

7. The cache memory of claim 6, wherein the control module is configured to control the execution of the respective cache request by the datapath by providing one or more control signals to control the first stage and the second stage.

8. The cache memory of claim 1, wherein the schedule module is further configured to assign different caching requests in the queue to different control modules of the plurality of control module, the different control modules configured to control parallel flows of cache lines associated with the different caching requests through the datapath.

9. The cache memory of claim 1, wherein the response includes the respective cache line or a request from the cache memory to transfer the cache line from a main memory to the cache memory.

10. A method, comprising:
 receiving, from a processing device, a plurality of caching requests, each caching request comprising a request to read or write a cache line of a cache memory, wherein the cache line is a data block of a predetermined size;
 placing the plurality of caching requests into a queue, wherein the plurality of caching requests is arranged in an order;
 identifying, based on the order, a respective caching request from the plurality of caching requests, the respective caching request comprising a request to read or write a respective cache line;
 selecting, for the respective caching request, a control module from a plurality of control modules in the cache memory; and
 assigning the respective caching request to the control module, the control module configured to control an execution of the respective cache request by a datapath in the cache memory and to control an output of a response of the cache memory to the processing device based on the execution of the respective caching request, wherein the respective cache line is stored in a buffer after the datapath reads or writes the respective cache line.

11. The method of claim 10, further comprising:
determining whether the buffer has sufficient free storage space to store the respective cache line before the respective caching request is assigned to the control module.

12. The method of claim 11, wherein the buffer is configured to store the respective cache line before the output of the response.

13. The method of claim 10, wherein selecting the control module from the plurality of control modules comprises:
determining whether the control module is not being assigned to other caching requests; and
after determining that the control module is not being assigned to other caching requests, selecting the control module.

14. The method of claim 10, further comprising associating a subset of the plurality of control modules with a category of caching requests, wherein selecting the control module from the plurality of control modules comprises:
determining that the respective caching request is not in the category; and
determining that the control module is not in the subset.

15. The method of claim 10, wherein assigning the respective caching request to the control module comprises sending address information to the control module, the address information indicates an address of the respective cache line in a main memory that is coupled to the cache memory, and the control module is configured to control the execution of the respective cache request by the datapath by:
controlling the datapath to identify a tag in a tag array of the datapath based on the address information, and
controlling the datapath to read the respective cache line from a data array of the datapath based on the identified tag.

16. The method of claim 10, further comprising:
removing the respective caching request from the queue after assigning the respective caching request to the control module.

17. The method of claim 10, further comprising:
receiving a notification from the control module that the respective caching request failed; and
after receiving the notification, storing information of the respective caching request, the information to be used for reading or writing the respective cache line through an execution of a new caching request.

18. The method of claim 10, further comprising:
selecting, for an additional caching request in the queue, an additional control module from the plurality of control modules, the additional caching request comprising a request to read or write an additional cache line; and
assigning the additional caching request to the additional control module, the additional control module configured to control an execution of the additional cache request by the datapath,
wherein the execution of the respective cache request comprises a flow of the respective cache line through at least part of the datapath, the execution of the additional cache request comprises a flow of the additional cache line through at least part of the datapath, and the flow of the respective cache line is in parallel with the flow of the additional cache line.

19. The method of claim 18, wherein the additional cache line is stored in the buffer after the data path reads or writes the additional cache line, and the response includes the respective cache line and the additional cache line that are retrieved from the buffer.

20. One or more non-transitory computer-readable media storing instructions executable to perform operations, the operations comprising:
receiving, from a processing device, a plurality of caching requests, each caching request comprising a request to read or write a cache line of a cache memory, wherein the cache line is a data block of a predetermined size;
placing the plurality of caching requests into a queue, wherein the plurality of caching requests is arranged in an order;
identifying, based on the order, a respective caching request from the plurality of caching requests, the respective caching request comprising a request to read or write a respective cache line;
selecting, for the respective caching request, a control module from a plurality of control modules in the cache memory; and
assigning the respective caching request to the control module, the control module configured to control an execution of the respective cache request by a datapath in the cache memory and to control an output of a response of the cache memory to the processing device based on the execution of the respective caching request,
wherein the respective cache line is stored in a buffer after the datapath reads or writes the respective cache line.

21. The one or more non-transitory computer-readable media of claim 20, wherein the operations further comprise:
determining whether the buffer has sufficient free storage space to store the respective cache line before the respective caching request is assigned to the control module.

22. The one or more non-transitory computer-readable media of claim 20, wherein the operations further comprise associating a subset of the plurality of control modules with a category of caching requests, and selecting the control module from the plurality of control modules comprises:
determining that the respective caching request is not in the category, and
determining that the control module is not in the subset.

23. The one or more non-transitory computer-readable media of claim 20, wherein assigning the respective caching request to the control module comprises sending address information to the control module, the address information indicates an address of the respective cache line in a main memory that is coupled to the cache memory, and the control module is configured to control the execution of the respective cache request by the datapath by:
controlling the datapath to identify a tag in a tag array of the datapath based on the address information, and
controlling the datapath to read the respective cache line from a data array of the datapath based on the identified tag.

24. The one or more non-transitory computer-readable media of claim 20, wherein the operations further comprise:
receiving a notification from the control module that the respective caching request failed; and
after receiving the notification, storing information of the respective caching request, the information to be used for reading or writing the respective cache line through an execution of a new caching request.

25. The one or more non-transitory computer-readable media of claim 20, wherein the operations further comprise:
removing the respective caching request from the queue after assigning the respective caching request to the control module.

\* \* \* \* \*